(12) United States Patent
Utaki et al.

(10) Patent No.: US 7,406,819 B2
(45) Date of Patent: Aug. 5, 2008

(54) CABLE PROTECTION AND GUIDE DEVICE

(75) Inventors: Akihiko Utaki, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/699,912

(22) Filed: Jan. 30, 2007

(65) Prior Publication Data

US 2007/0228227 A1 Oct. 4, 2007

(30) Foreign Application Priority Data

Mar. 28, 2006 (JP) .............................. 2006-088909

(51) Int. Cl.
*F16G 13/00* (2006.01)
(52) U.S. Cl. .............................. 59/78.1; 248/49; 248/51
(58) Field of Classification Search ................. 59/78.1; 248/49, 51
See application file for complete search history.

(56) References Cited

U.S. PATENT DOCUMENTS 5,768,882 A * 6/1998 Weber et al. .................. 59/78.1
6,128,893 A * 10/2000 Weber et al. .................. 59/900
6,550,232 B1 * 4/2003 Achs et al. .................... 59/78.1
6,864,425 B2 * 3/2005 Ikeda et al. ................... 59/78.1
6,978,595 B2 * 12/2005 Mendenhall et al. ......... 59/78.1
6,984,782 B2 * 1/2006 Ikeda et al. ................... 59/78.1
7,047,720 B2 * 5/2006 Ikeda et al. ................... 248/49

FOREIGN PATENT DOCUMENTS

| JP | H02-056557 | 2/1992 |
| JP | 09-512083 | 10/1995 |
| JP | 09-177902 | 7/1997 |
| JP | 10-047441 | 2/1998 |
| JP | 2001-003997 | 6/1999 |
| JP | 2000-120807 | 4/2000 |
| JP | 2003-299328 | 10/2003 |

* cited by examiner

*Primary Examiner*—David B Jones
(74) *Attorney, Agent, or Firm*—Woodling, Krost and Rust

(57) ABSTRACT

A cable or the like protection and guide device can be applied to various conditions at a mounting fixed end and a mounting movable end. A cable or the like protection and guide device (100) in which mounting brackets (140, 140) are detachably connected to a pair of right and left side plate units (110, 110) adjacent to the mounting fixed end through fixed end side adaptors (130, 130) respectively, and mounting brackets are detachably connected to a pair of right and left side plate units (110, 110) adjacent to the mounting movable end through movable end side adaptors, (150, 150), respectively.

16 Claims, 20 Drawing Sheets

CABLE PROTECTION AND GUIDE DEVICE

Priority is claimed to Japanese Patent Application No. 2006-088909 filed Mar. 28, 2006.

TECHNICAL FIELD

The present invention relates to a cable or the like protection and guide device. More specifically it relates to a cable or the like protection and guide device suitable for accommodating a cable, a hose or the like, which supplies a movable member of an industrial machine with electric power or energy in the form of compressed air.

BACKGROUND TECHNOLOGY

A conventional cable or the like protection and guide device includes upper end portions and lower end portions of a number of connected pairs of right and left resin link plates from a mounting fixed end toward a mounting movable end. Flaps and bottom plates are used as connecting members. A fixed side mount fitting is detachably mounted to resin link plates adjacently arranged on mounting fixed edges in a right and left symmetrical manner, respectively. A movable side mount fitting is detachably mounted to resin link plates adjacently arranged on mounting movable edges in a right and left symmetrical manner, respectively. See, Patent Reference 1, Japanese Laid-Open Patent Publication No. 2000-120807.

Since in such a protection and guide chain, the fixed side mount fitting and the movable side mount fitting are composed of metal, wear damage is liable to occur in a connecting portion to a resin link plate and the endurance of the entire chain is in question.

A cable or the like protection and guide device includes a number of pairs of right and left spaced side plate units connected to each other from a mounting fixed end toward a mounting movable end. The connecting plates are detachably bridged over flexional inner circumferential sides and flexional outer circumferential sides of the side plate units in predetermined intervals. A fixed side mounting bracket is connected to side plate units proximately arranged on the mounting fixed ends in a symmetrical manner, respectively. A movable side mounting bracket is connected to side plate units proximately arranged on the mounting movable ends in a symmetrical manner, respectively. In this way a cable or the like is accommodated in cable accommodating space surrounded by the side plate units and the connecting plates from the mounting fixed end toward the mounting movable end.

See, Patent Reference 2, the specification of Japanese Patent Application Publication No. 2006-69527.

DISCLOSURE OF THE INVENTION

Problems to be Solved by the Invention

However, as shown in FIG 24, when fixed side mounting brackets 530 and movable side mounting brackets 550 are respectively arranged in a symmetrical manner in the width direction of the cable accommodating space and in a symmetrical manner in the longitudinal direction of the cable accommodating space, a cable or the like protection and guide device 500 of as set forth in Patent Reference 2 filed by the present inventors requires four kinds of bracket shapes. Further, a flexional inner circumferential side mount form as shown in FIG. 24 is changed to a flexional outer circumferential side mount form as shown in FIG. 25, side plate units 510 are liable to flex with respect to each other. Even if the fixed side mounting brackets 530 and the movable side mounting brackets 550 are respectively turned over between the flexional inner circumferential side and the flexional outer circumferential side the brackets cannot be used. Thus four additional kinds of bracket shapes are required.

As a result, in order to completely adapt bracket shapes to various mounting state on the flexional inner circumferential side and on the flexional outer circumferential side, eight kinds of bracket shapes are needed. Thus the number of mounting parts required other than the side plate units 510 increased whereby inventory and costs were increased.

Accordingly, the object of the present invention is to solve the above-mentioned problems by providing a cable or the like protection and guide device in which the number of mounting parts is reduced and the device can be adapted to various mount states at the mounting fixed end and the mounting movable end. Additionally, the object includes the achievement of assembly and disassembly operations which are very easy to perform. Further, it was an object to provide a device wherein excellent fatigue resistance is achieved.

Means for Solving the Problems

The invention attains the above-mentioned object wherein a number of pairs of right and left spaced side plate units are connected to each other from a mounting fixed end toward a mounting movable end. Connecting plates are detachably bridged over flexional inner circumferential sides and flexional outer circumferential sides of the side plate units in predetermined intervals. Thus a cable is accommodated in cable accommodating space surrounded by the side plate units and the connecting plates from the mounting fixed end toward the mounting movable end. A mounting bracket is detachably connected to each one of the pair of right and left side plate units proximate to said mounting fixed end by a fixed end side adaptor. A mounting bracket is detachably connected to each one of the pair of right and left side plate units adjacent to the mounting movable end by a movable end side adaptor.

Each of the adaptors includes a unit side connecting portion which has the same connection form as between said side plate units and a bracket side connecting portion. The side plate units include front portion and rear portions which are symmetrical to each other between the mounting fixed end and mounting movable end. Each fixed end side adaptor and movable end side adaptor includes a bracket connecting portion which conforms to and can be connected to both said fixed end side adapter and said movable end side adaptor. Each of the adaptors includes a bracket side connecting portion and an outer surface to be mounted onto the mounting fixed end or the mounting movable end. The left and rights brackets are formed so as to mate with the bracket side connecting portions of the adaptors.

The invention attains the above-mentioned object by providing a side plate unit which comprises a side plate front portion, which is connected to a preceding side plate unit, a side plate rear portion, which is connected to a subsequent side plate unit, and a flexible coupling portion integrally intervened between said side plate front portion and said plate rear portion.

The invention further comprises a connecting plate bridged over the pair of right and left fixed end side adaptors and the pair of right and left movable end side adaptors, respectively.

The invention further comprises a connecting engagement portion attachably bridged over by rotating a pair of right and left supporting shafts formed on the connecting plate in a protruded manner is formed on at least a flexional inner circumferential side of the side plates and a flexional outer circumferential side of the side plates, respectively.

The invention further comprises a side plate unit, a connecting plate, a fixed end side adaptor, a movable end side adaptor, and a mounting bracket all of which are molded from a fatigue resistant resin material of a polyamide resin or a polybutylene terephthalate resin formulated with a component of elastomer or rubber.

Effects of the Invention

First, according to the cable protection and guide device of the invention, since a number of pairs of right and left spaced side plate units are connected to each other from a mounting fixed end toward a mounting movable end and connecting plates are detachably bridged over flexional inner circumferential sides and flexional outer circumferential sides of said side plate units in predetermined intervals, a cable can be accommodated in cable accommodating space surrounded by the side plate units and the connecting plates from the mounting fixed end toward the mounting movable end.

A mounting bracket is detachably connected to each of the pair of right and left side plate units adjacent to the mounting fixed end through a fixed end side adaptor. A mounting bracket is detachably connected to each of the pair of right and left side plate units adjacent to the mounting movable end through a movable end side adaptor. A unit side connecting portion of the adaptors has the same connection form as that between the side plate units. A bracket side connecting portion of the adaptors has front and rear portions which are symmetrical to each other between the mounting fixed end and mounting movable end. The adaptors are to be connected to both the fixed end side bracket and the movable end side bracket. Each of the adaptors includes an outer surface to be mounted onto the pair of right and left mounting brackets. When a mount form on the flexional outer circumferential side is changed to a mount form on the flexional inner circumferential side, if mounting brackets are interchanged between the mounting fixed end and the mounting movable end and the right and left mounting brackets are interchanged while the fixed end side adaptor and the movable end side adaptor are each connected to the side plate unit, the change between the mount forms on the flexional outer and inner circumferential sides can be realized. Thus in order to adapt the cable protection and guide device to various mount states on the flexional outer circumferential side and the flexional inner circumferential side, six kinds of mounting parts consisting of a pair of right and left mounting brackets, a pair of right and left fixed end side adaptors and a pair of right and left movable end side adaptors is sufficient. As a result the cable protection and guide device can be adapted to various mount states at the mounting fixed end and the mounting movable end by reducing parts from eight kinds of mounting parts.

According to the invention since the side plate unit comprises a side plate front portion, which is connected to a preceding side plate unit, a side plate rear portion, which is connected to a subsequent side plate unit, and a flexible coupling portion integrally intervened between the side plate front portion and the side plate rear portion, the coupling portion flexibly adapts to repeated flexions. Thus damage liable to occur at the coupling portion of the side plate unit due to repetition of a flexional operation is avoided, excellent fatigue resistance is exhibited and wear powders in a sliding portion of the side plate unit are suppressed so that the device can be used in clean environments.

According to the invention, since the connecting plate is bridged over a pair of right and left fixed end side adaptors and over a pair of right and left movable end side adaptors, respectively, strong engagement is achieved. By using the pair of right and left fixed end side adaptors and the pair of right and left movable end side adaptors at two positions of both ends of the connecting plate, inadvertent disengagement is avoided. As a result assembly and disassembly of the mounting brackets with and from the fixed end side adaptors and the movable end sides becomes easy and maintenance of the cable is facilitated.

According to the invention, a connecting engagement portion, which is attachably bridged over the side plates by rotating engagement of a pair of right and left supporting shafts formed on the connecting plate in a protruded manner. The connecting plates are bridged over the flexional inner circumferential side of the side plate and a flexional outer circumferential side of the side plate, respectively. Even if force that comes out of the cable accommodated inside is generated by the cable itself, the supporting shafts of the connecting plate are fitted into the connecting engagement portions and the connecting plate is supported on both ends of the connecting plate whereby the supporting shafts of the connecting plate are secured with respect to the side plate units. Inadvertent disengagement can be completely avoided. Further, since the two positions of both ends of the connecting plate are simultaneously fitted onto the pair of right and left side plate units during an opening/closing operation of the connecting plates, damage to the cable in the cable accommodating space during the opening/closing operation of the connecting plates, can be also completely avoided. Further, during cable maintenance the connecting plate is rotated or pivoted at a connecting engagement portion without disengaging the connecting plate and the cable is in an exposed state so that a maintenance is easy.

According to the invention, since the side plate unit, connecting plate, the fixed end side adaptor, the movable end side adaptor, and the mounting bracket are molded using a fatigue resistant resin material of a polyamide resin or a polybutylene terephthalate resin formulated with a component of elastomer or rubber, the elastomer or rubber component formulated in the polyamide resin or the polybutylene terephthalate resin adds flexibility and excellent fatigue resistance.

Figure 1:
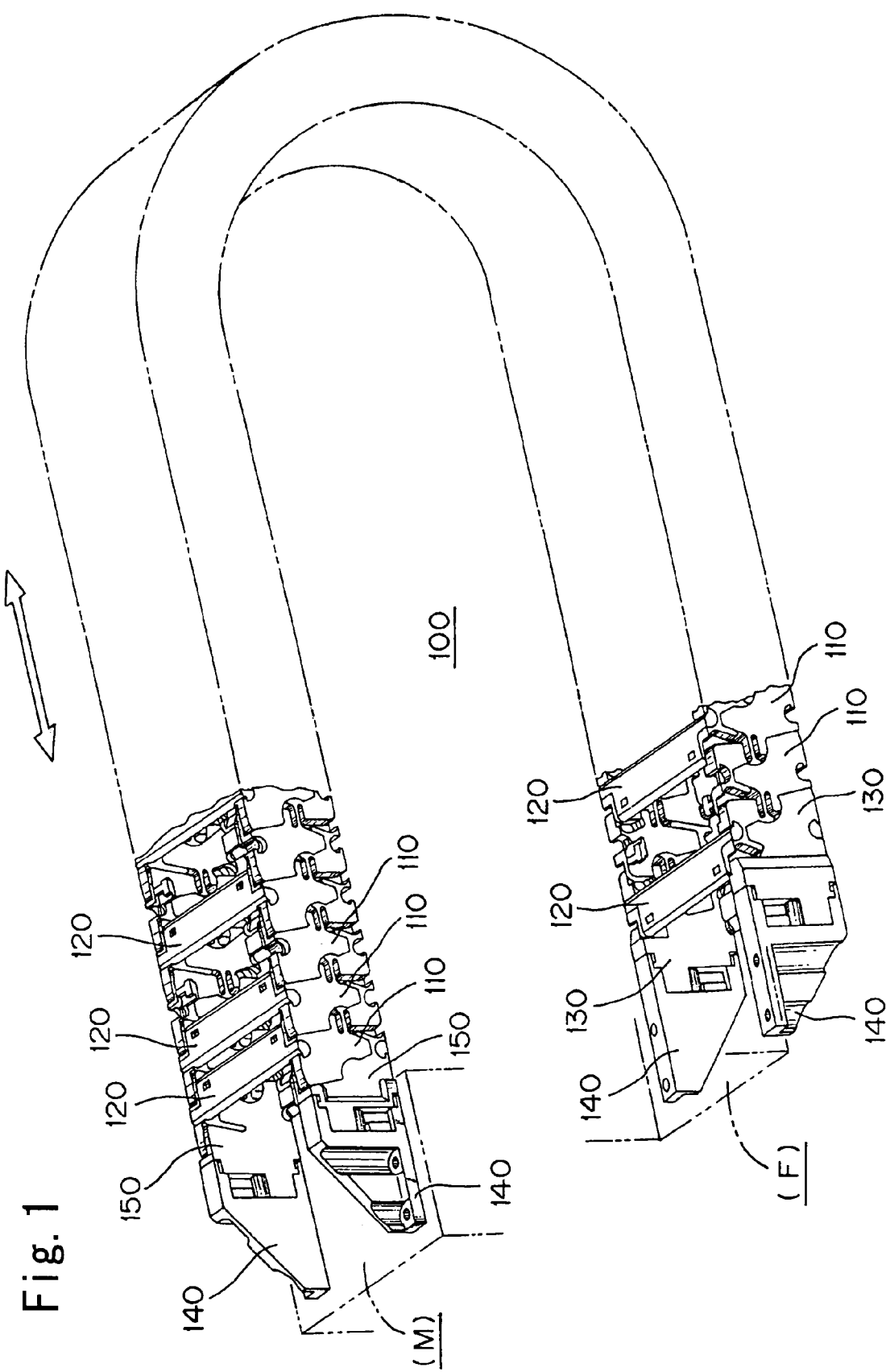
FIG. 1 is an entire view showing a use form of a cable or the like protection and guide device 100, which is an example according to the present invention.

A better understanding of the drawings will be had when reference is made to the Description Of The Invention and Claims which follow herein below.

DESCRIPTION OF THE INVENTION

If the number of mounting parts is reduced so that a cable or the like protection and guide device can be used in various mount states at the mounting fixed end and the mounting movable end, the assembly and disassembly of a cable protection and guide device becomes easy. Accordingly, a cable protection and guide device having a number of pairs of right and left spaced side plate units are connected to each other from a mounting fixed end toward a mounting movable end is disclosed. The connecting plates are detachably bridged over flexional inner circumferential sides and flexional outer circumferential sides of said side plate units in predetermined intervals so that a cable or the like is accommodated in cable accommodating space surrounded by the side plate units and the connecting plates from the mounting fixed end toward the mounting movable end. A mounting bracket is detachably connected to each of the pair of right and left side plate units in proximity to the mounting fixed end through a fixed end side adaptor. A mounting bracket is detachably connected to each of the pair of right and left side plate units adjacent to the mounting movable end through a movable end side adaptor. A unit side connecting portion which has the same connection form as that between the side plate units is employed. A bracket side connecting portion whose front portion and a rear portions are symmetrical to each other between the mounting fixed end and mounting movable end are employed. The bracket side connection portions are formed on the fixed end side adaptor and the movable end side adaptor.

An adaptor side connecting portion which conforms to and can be connected to both the fixed end side adapter and the movable end side adaptor includes an outer surface to be mounted onto the pair of right and left mounting brackets.

The side plate, the side plate unit, the connecting plate, the fixed end side adaptor, the movable end side adaptor and the mounting bracket used in the cable protection and guide device of the present invention, may be made of engineering plastic resins such as polyamide 6, polyamide 12, polyamide 46, polyamide 66, acryl, polyacetal and the like, which resist flexion strain which occurs during flexional operation. As such excellent dimensional stability is exhibited and achieved.

Particularly, when the above-mentioned members such as the side plate unit and others are molded using a fatigue resistant resin material such as an elastomer or rubber component-formulated polyamide resin or polybutylene terephthalate, the elastomer or rubber component-formulated polyamide resin or polybutylene terephthalate adds flexibility to impact resistance and excellent fatigue resistance to repeated flexions. Thus the elastomer or rubber component-formulated polyamide resin or polybutylene terephthalate is preferred.

Further, another example of the side plate units arranged in a pair (the right and left side plate units) and used in the cable protection and guide device of the present invention, may be a side plate unit form in which a side plate front portion is connected to a preceding side plate unit and a side plate rear portion is connected to the subsequent side plate unit are utilizing a connecting pin mechanism. In this way the side plate units are connected to each other and pivotably flex in an offset manner between a side plate rear portion of the preceding side plate unit and a side front plate portion of a side plate unit subsequent to the side plate rear portion. Still alternatively, a side plate form in which a side plate front portion connected to a preceding side plate unit, a side plate rear portion connected to the subsequent side plate unit and a flexible coupling portion are integrally intervened between the side plate front portion and the side plate rear portion. In this example the plates are integrally formed and use a snap-fit mechanism which connects the side plate units to each other which is provided between a side plate rear portion of a preceding side plate unit and a side plate front portion of a side plate unit subsequent to the side plate rear portion. In the latter case, an inadvertent disengagement of the side plate unit at a coupling portion due to repeated flexional operations is avoided. And, a load which is liable to occur at a flexed portion during the restriction of a flexional position is avoided so that excellent endurance can be exhibited. Also, the number of parts necessary is reduced and the maintenance of the cable is made easy.

And although the connecting plates used in the cable or the like protection and guide device according to the present invention are detachably bridged over the flexional inner circumferential side and the flexional outer circumferential side of the side plate units, they may be bridged over every side plate unit or intermittently in the longitudinal direction.

EXAMPLE

A cable or the like protection and guide device 100, which is an example of the present invention, will be described with reference to FIGS. 1 and 21 below.

Figure 2:
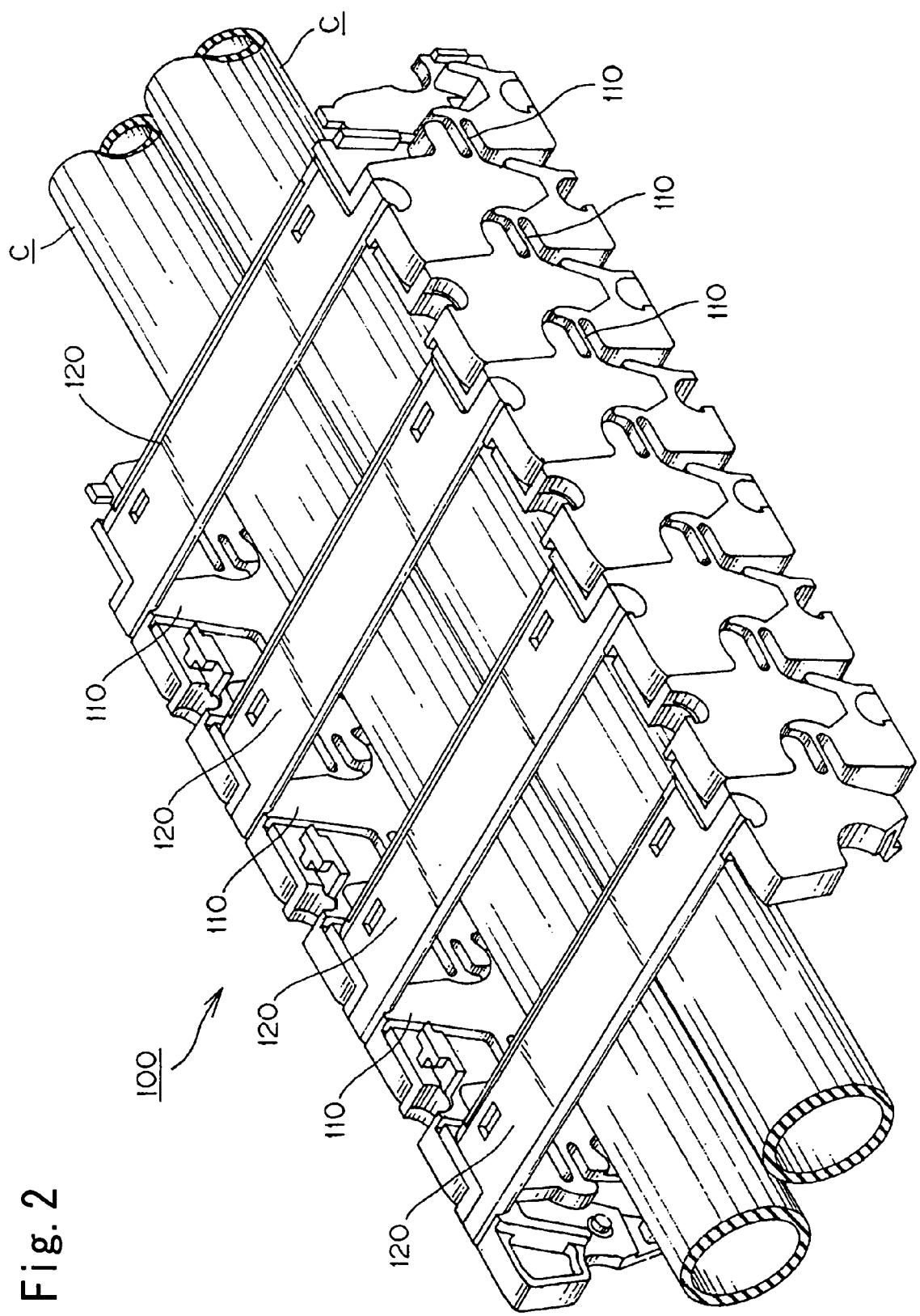
FIG. 2 is an enlarged view of a linear region shown in FIG. 1.
Figure 3:
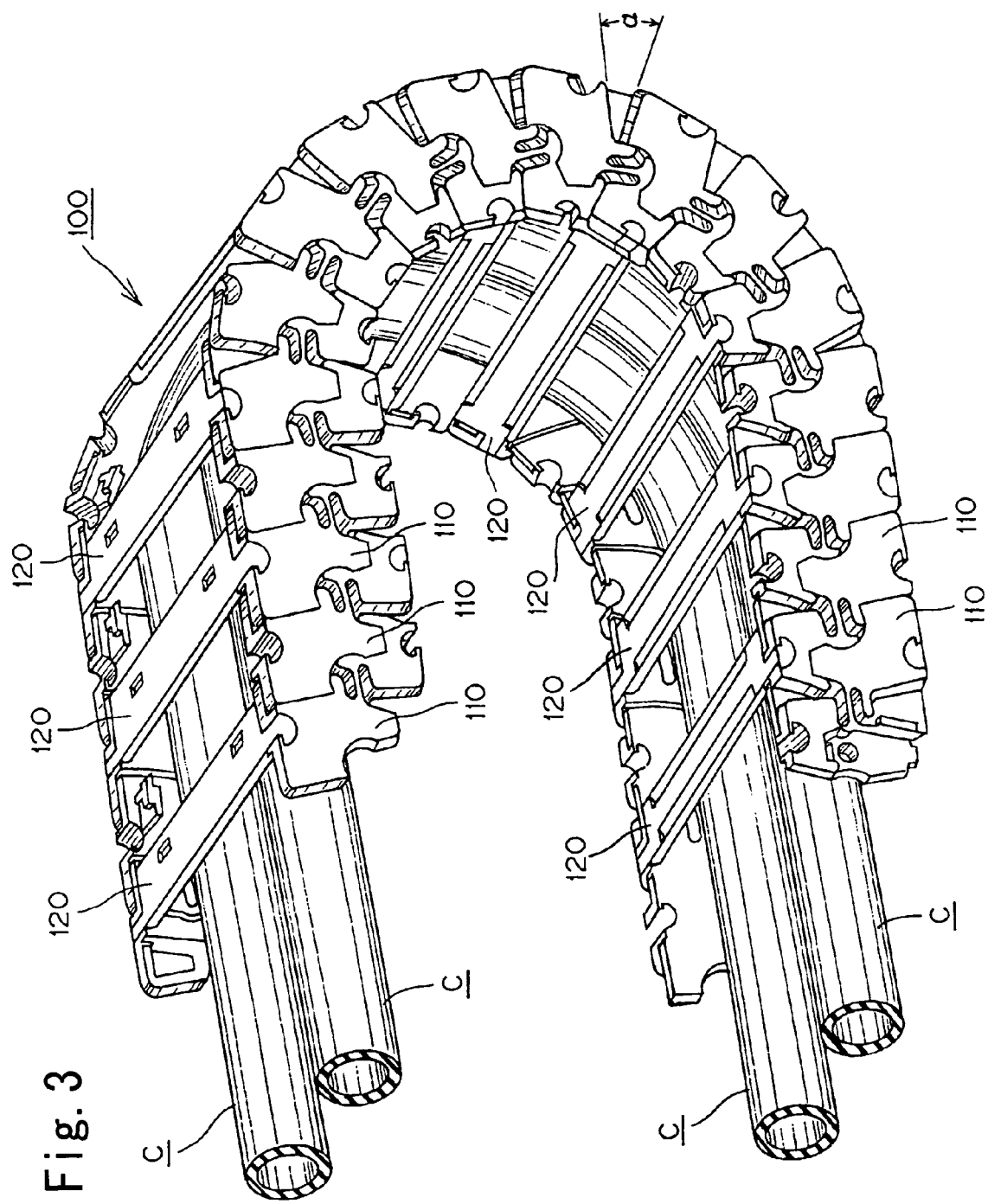
FIG. 3 is an enlarged view of a flexed region shown in FIG. 1
Figure 4:
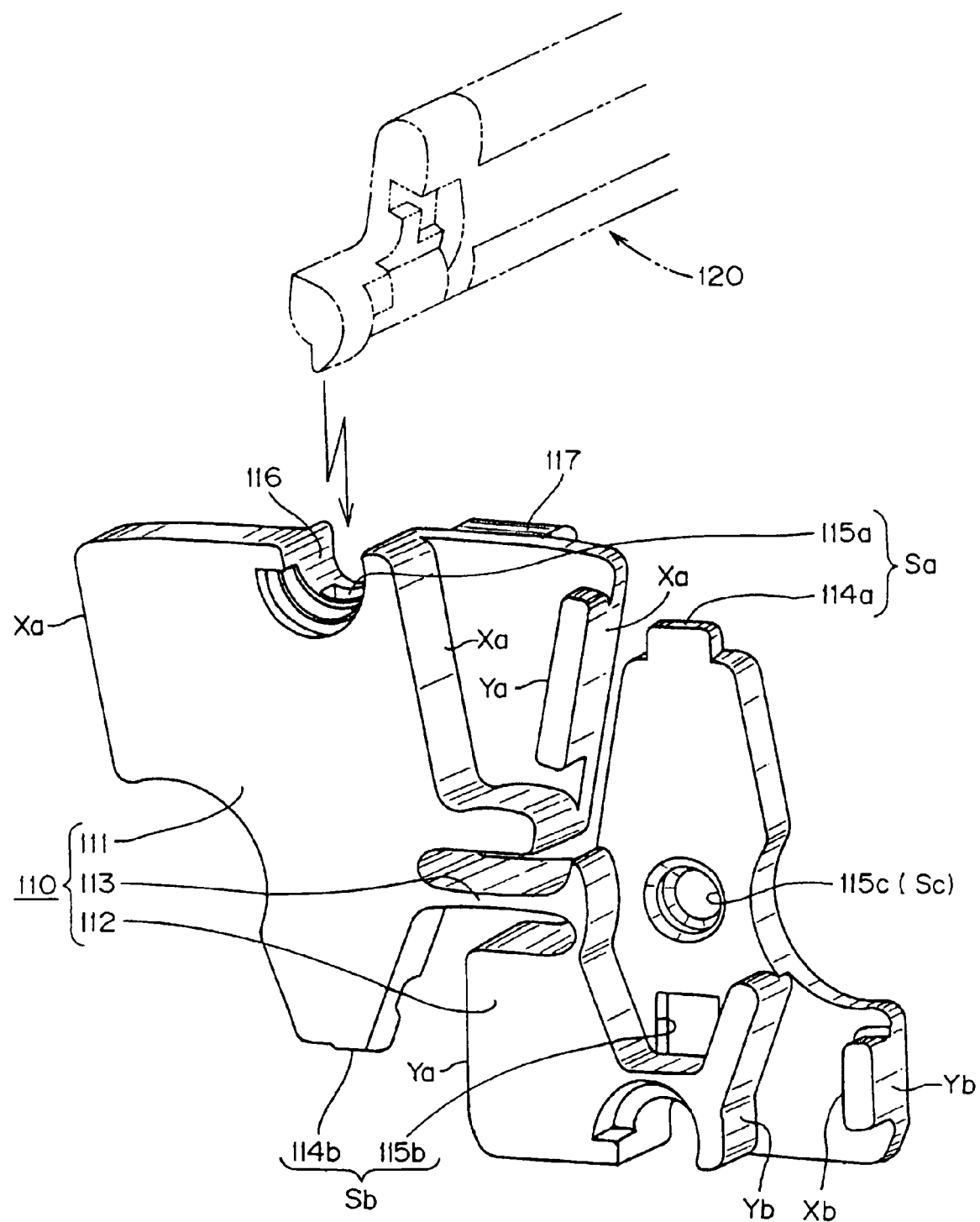
FIG. 4 is a perspective view viewed from the outside of the side plate unit used in the present example.
Figure 5:
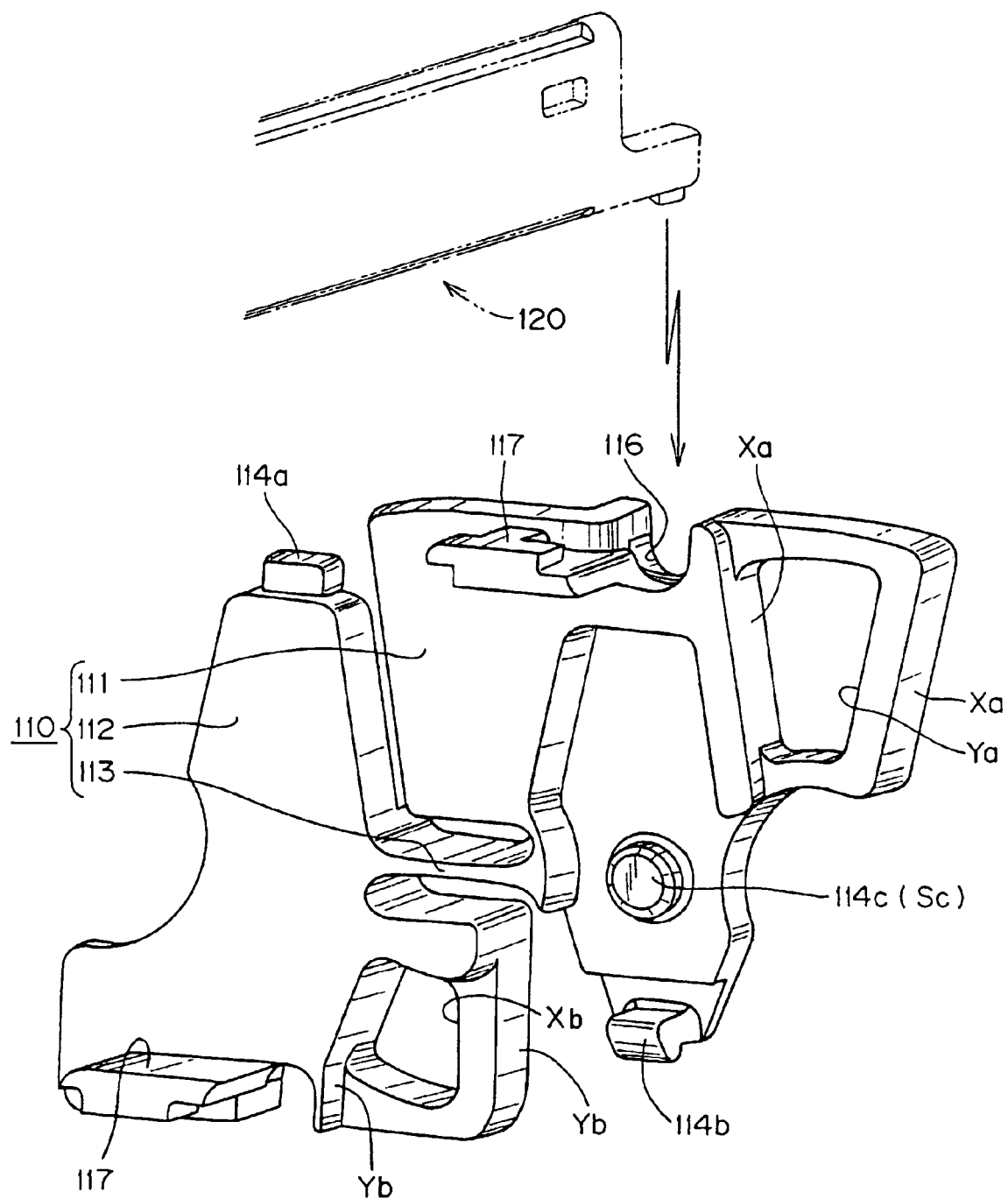
FIG. 5 is a perspective view viewed from the inside of the side plate unit used in the present example.
Figure 6:
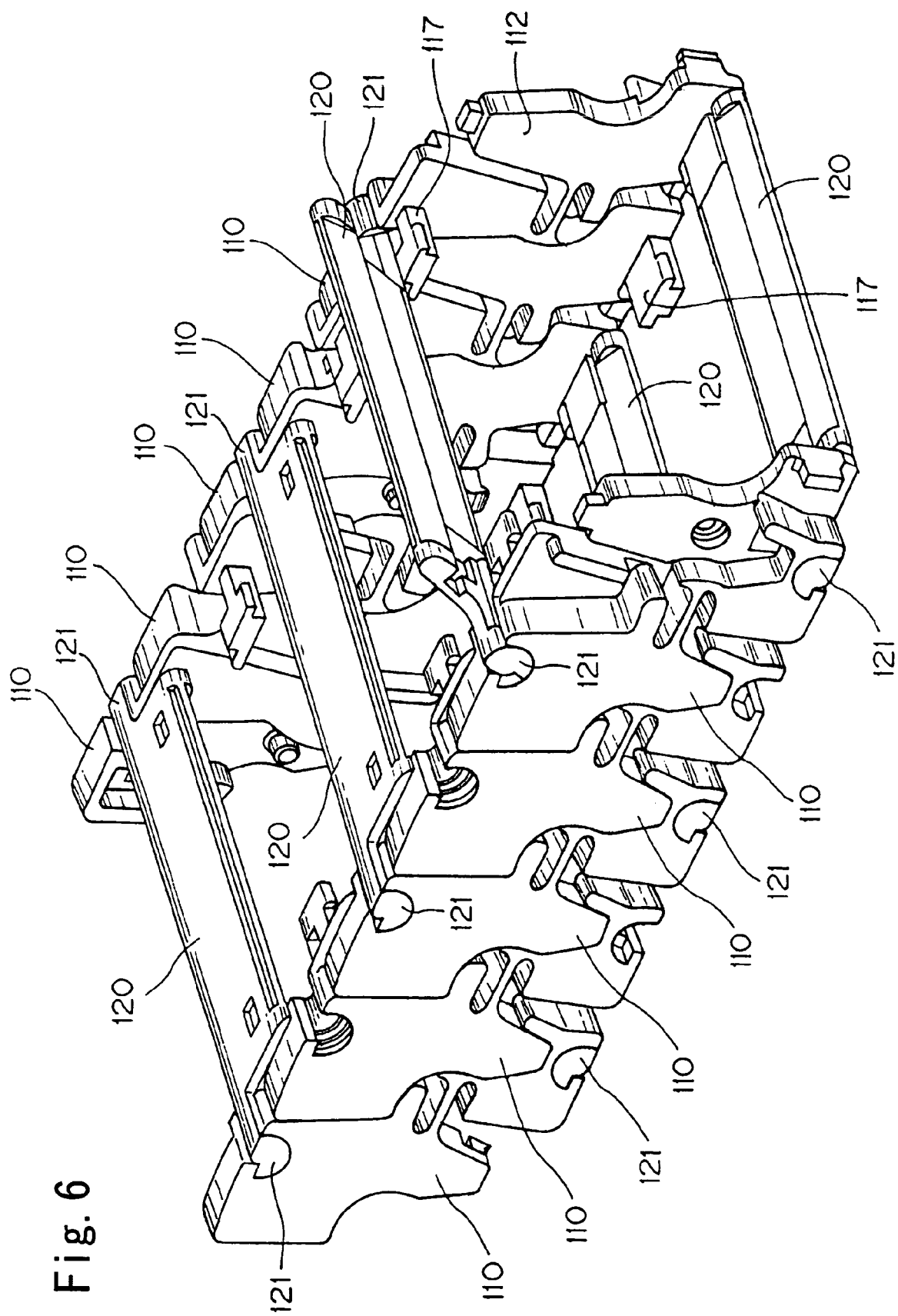
FIG. 6 is a partial exploded view for explaining the incorporation of a side plate unit to connecting plates.
Figure 7:
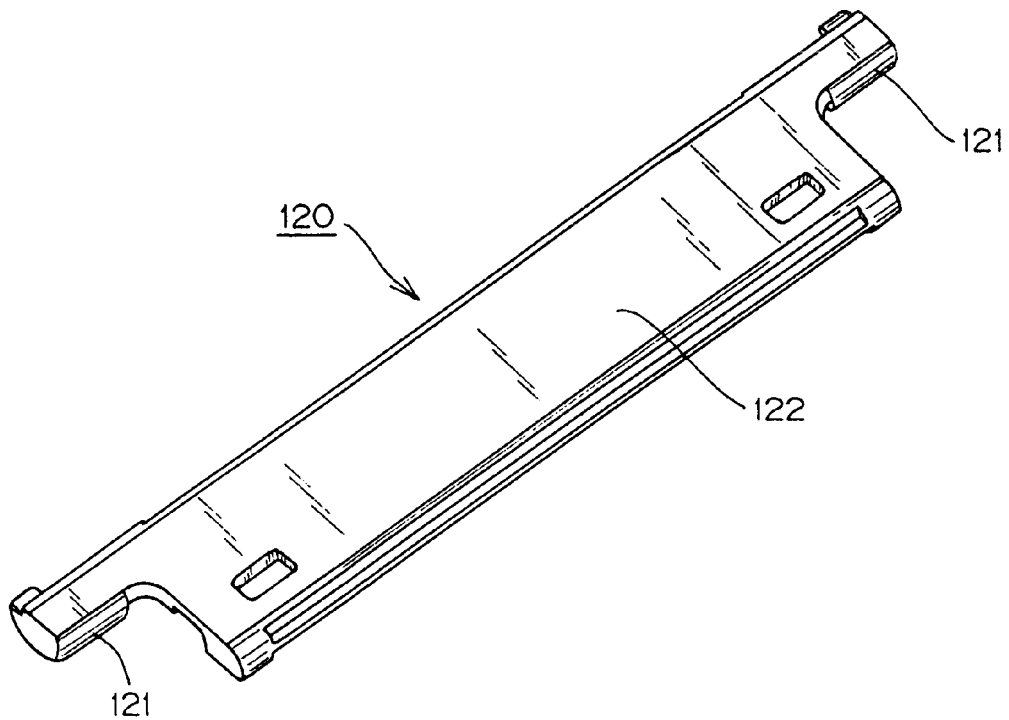
FIG. 7 is a perspective view vied from a front side of the connecting plate.
Figure 8:
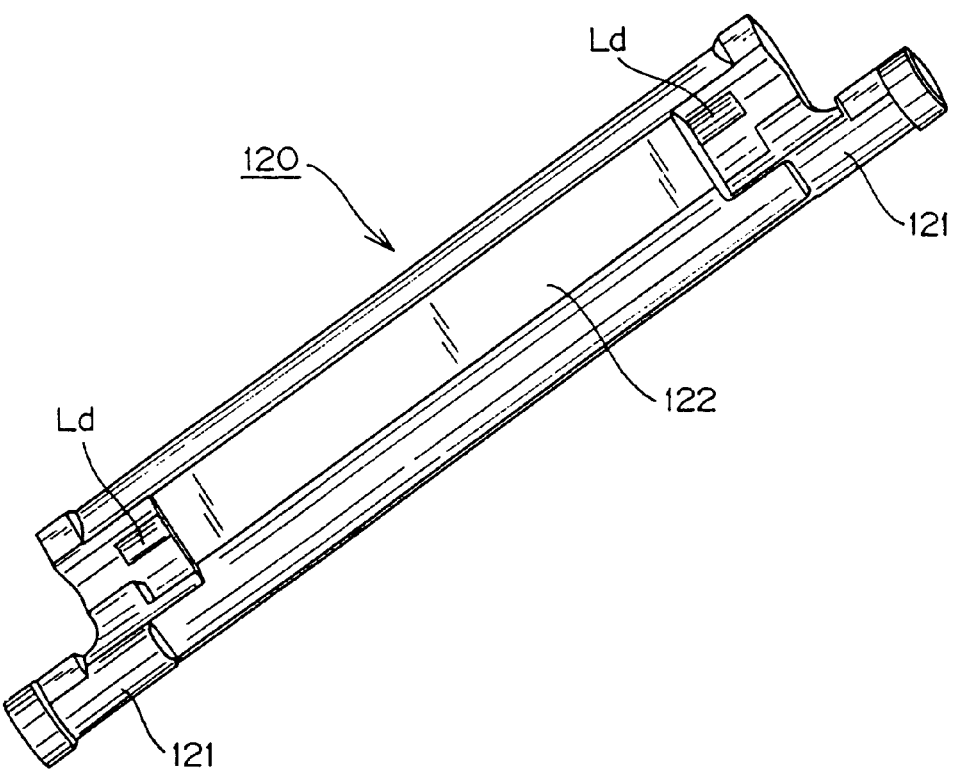
FIG. 8 is a perspective view viewed from a back side of the connecting plate.
Figure 9:
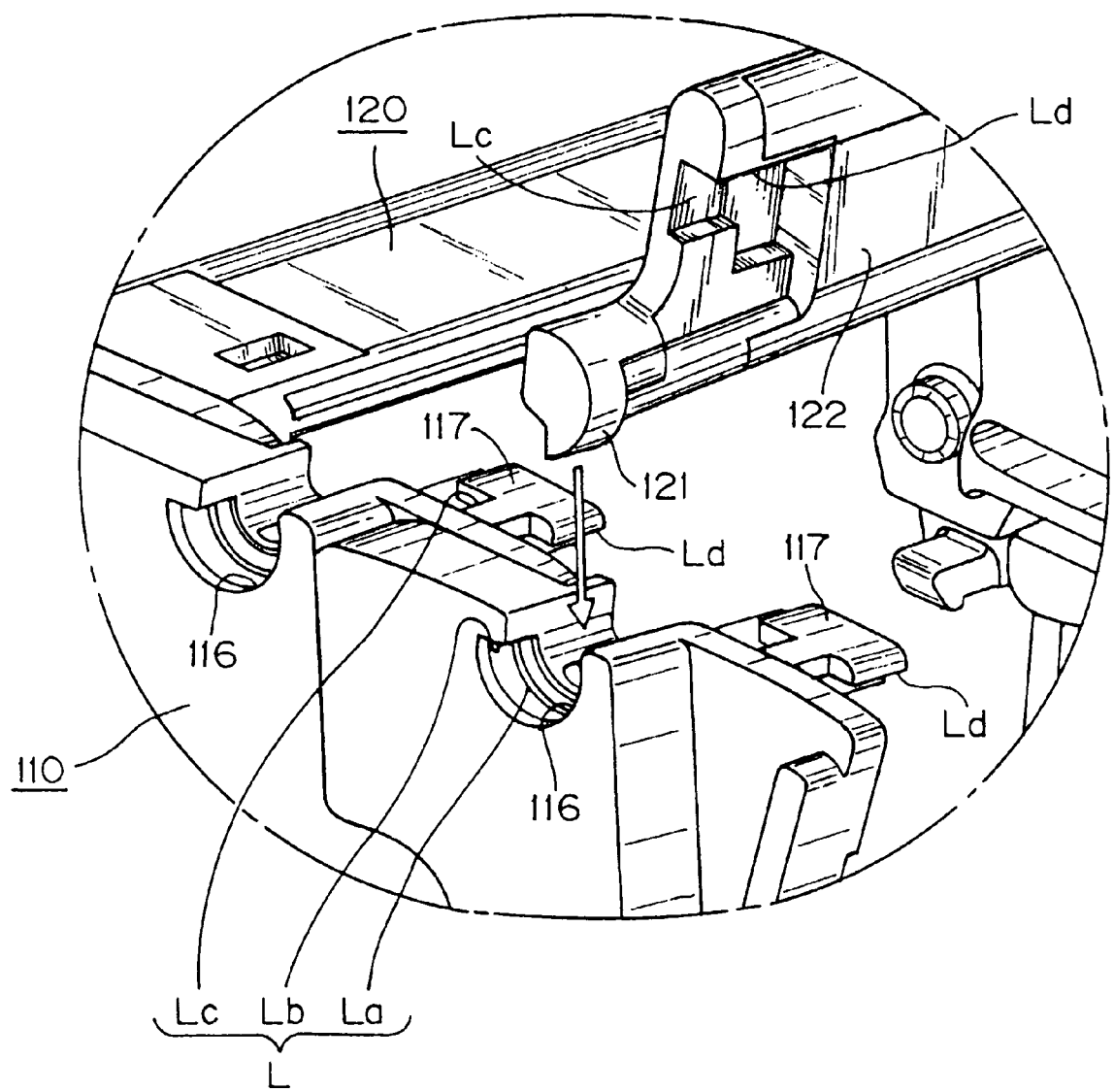
FIG. 9 is an enlarged view showing a starting state of incorporation of the connecting plate.

Here, FIG. 1 is an entire view showing a use form of a cable or the like protection and guide device 100, which is an example according to the present invention. FIG. 2 is an enlarged view of a linear region shown in FIG. 1. FIG. 3 is an enlarged view of a flexed region shown in FIG. 1. FIG. 4 is a perspective view from the outside of the side plate unit used in the present example. FIG. 5 is a perspective view from the inside of the side plate unit used in the present example. FIG. 6 is a partial exploded view for explaining the incorporation of a side plate unit to connecting plates. FIG. 7 is a perspective view from a front side of the connecting plate. FIG. 8 is a perspective view from a back side of the connecting plate and FIG. 9 is an enlarged view showing a starting state of incorporation of the connecting plate.

Figure 10:
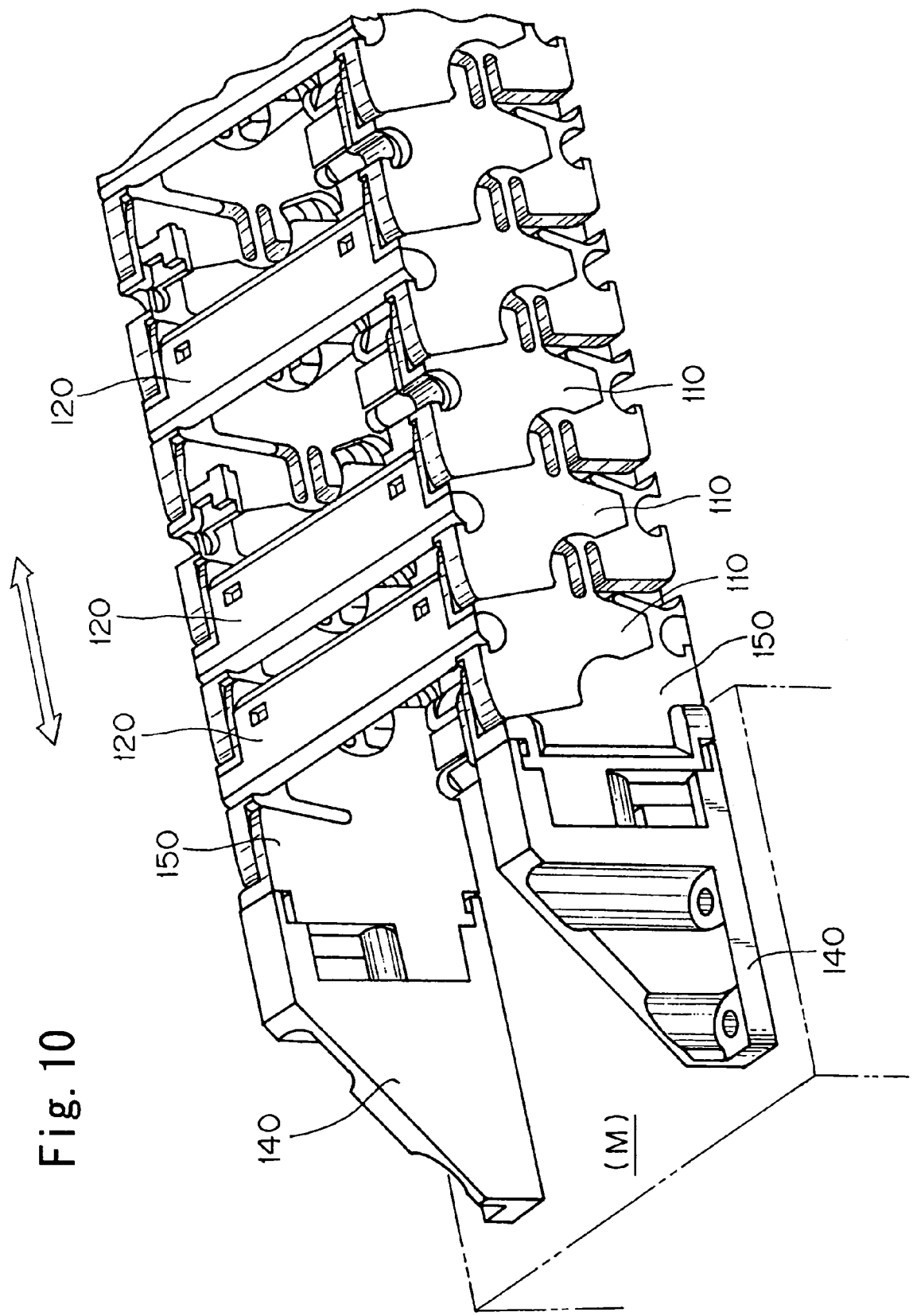
FIG. 10 is an enlarged view showing a connected state in a mounting movable end.
Figure 11:
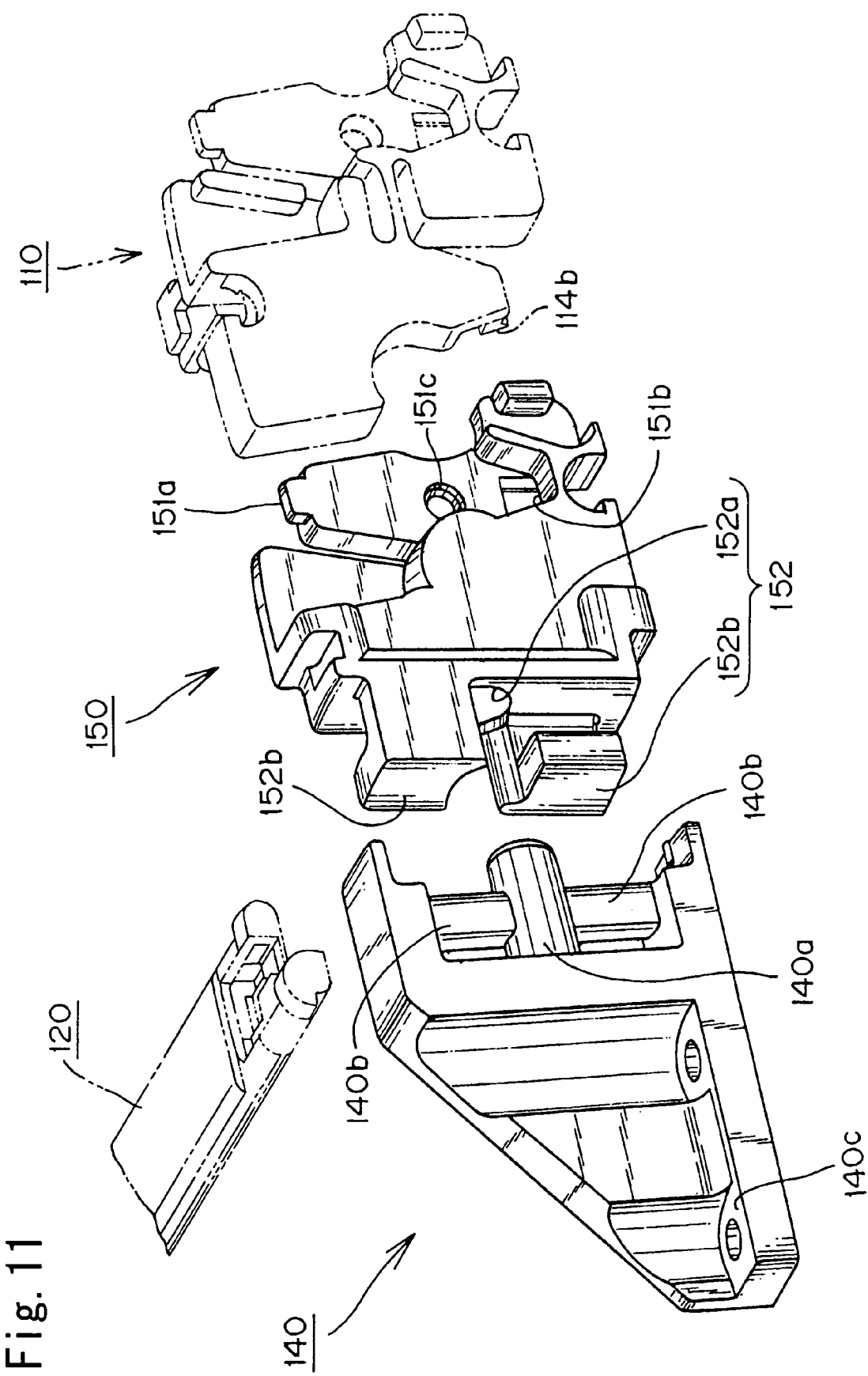
FIG. 11 is an exploded view of the mounting movable end viewed from the outside while placing a movable end side adaptor at the center.
Figure 12:
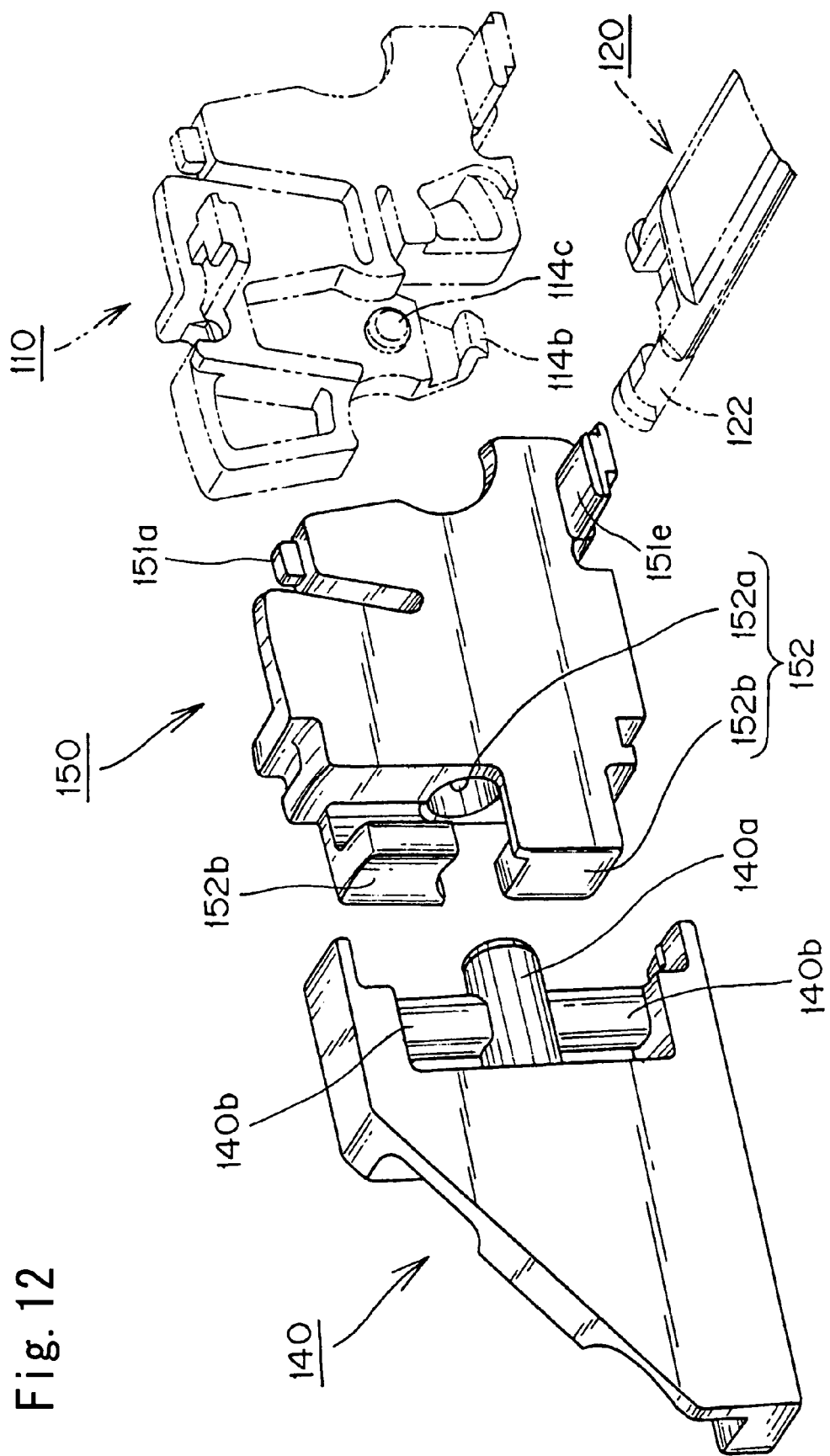
FIG. 12 is an exploded view of the mounting movable end viewed from the inside while placing a movable end side adaptor at the center.
Figure 13:
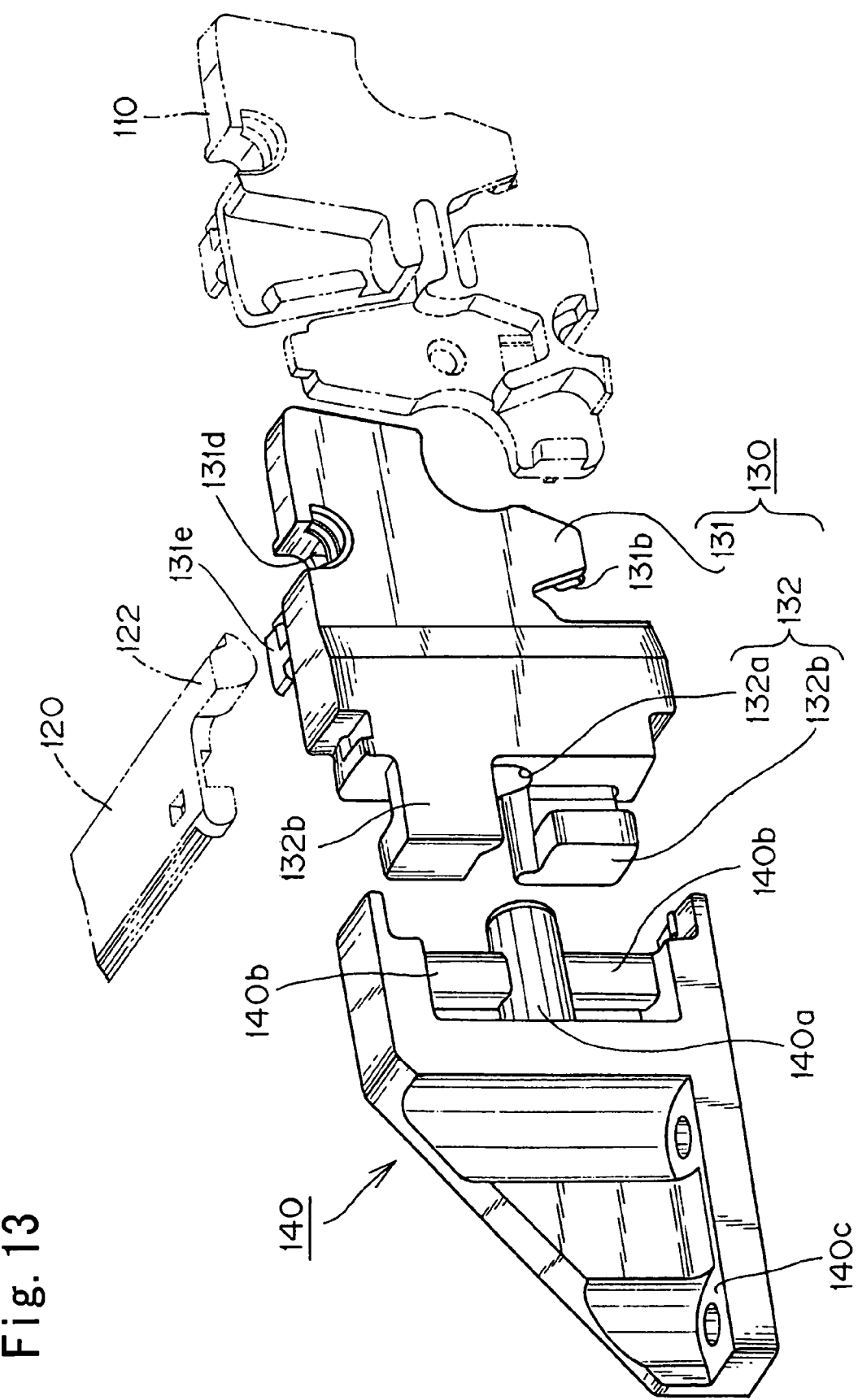
FIG. 13 is an exploded view of a mounting fixed end viewed from the outside while placing a fixed end side adaptor at the center.
Figure 14:
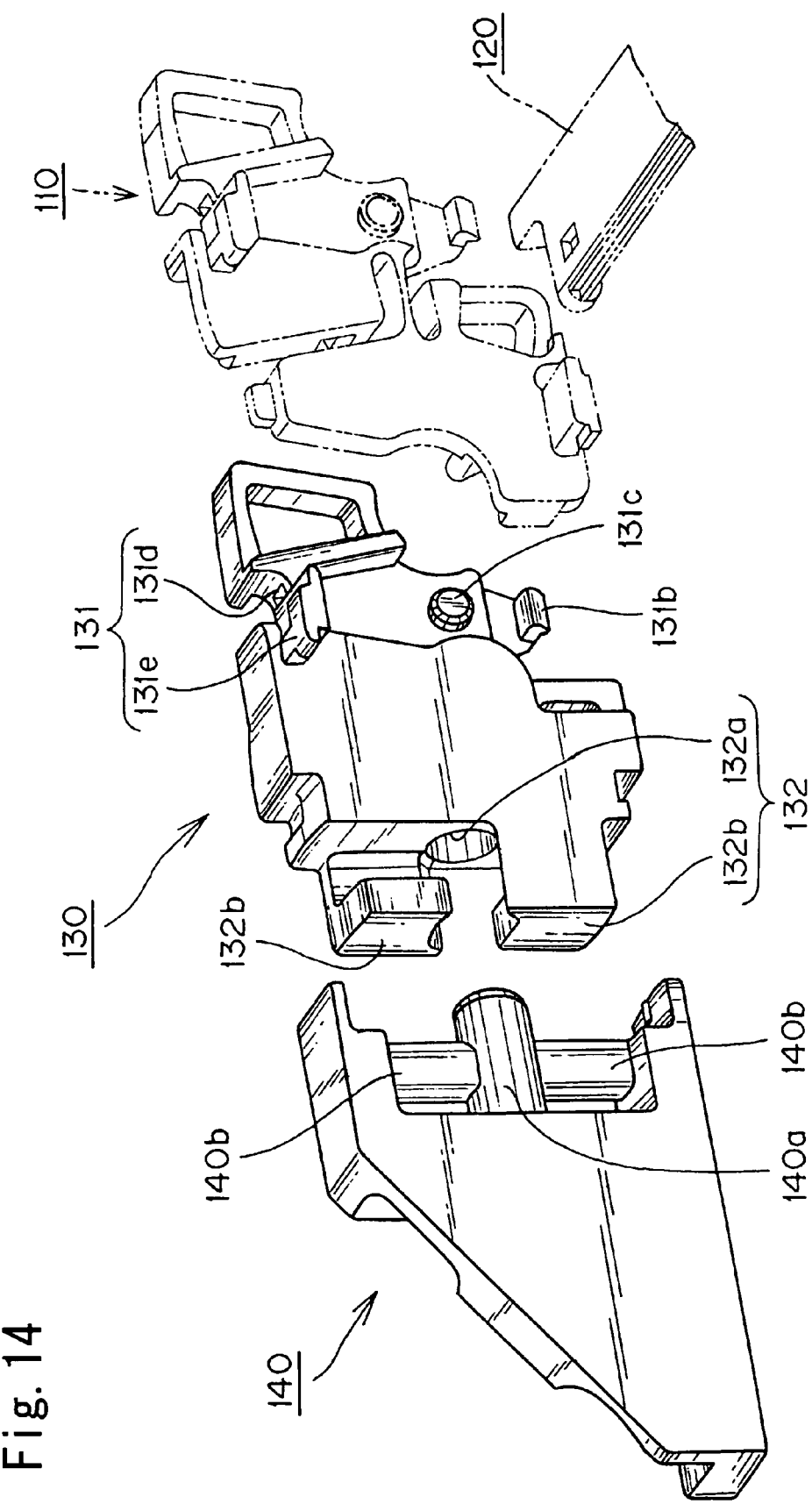
FIG. 14 is an exploded view of the mounting fixed end viewed from the inside while placing a fixed end side adaptor at the center.
Figure 15:
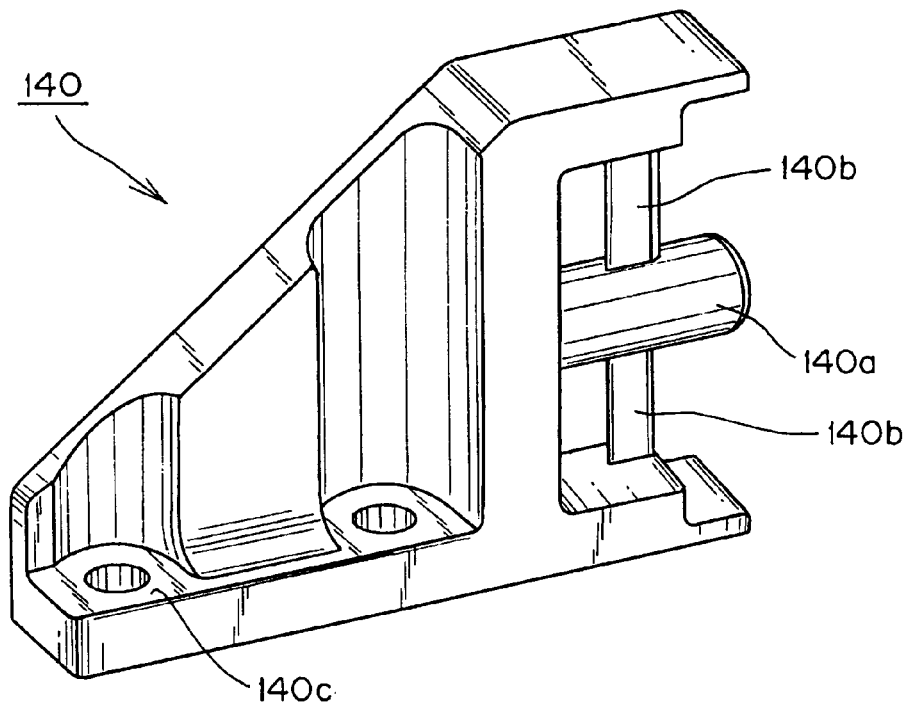
FIG. 15 is an enlarged view of a mounting bracket arranged on the right side of a mounting movable end.
Figure 16:
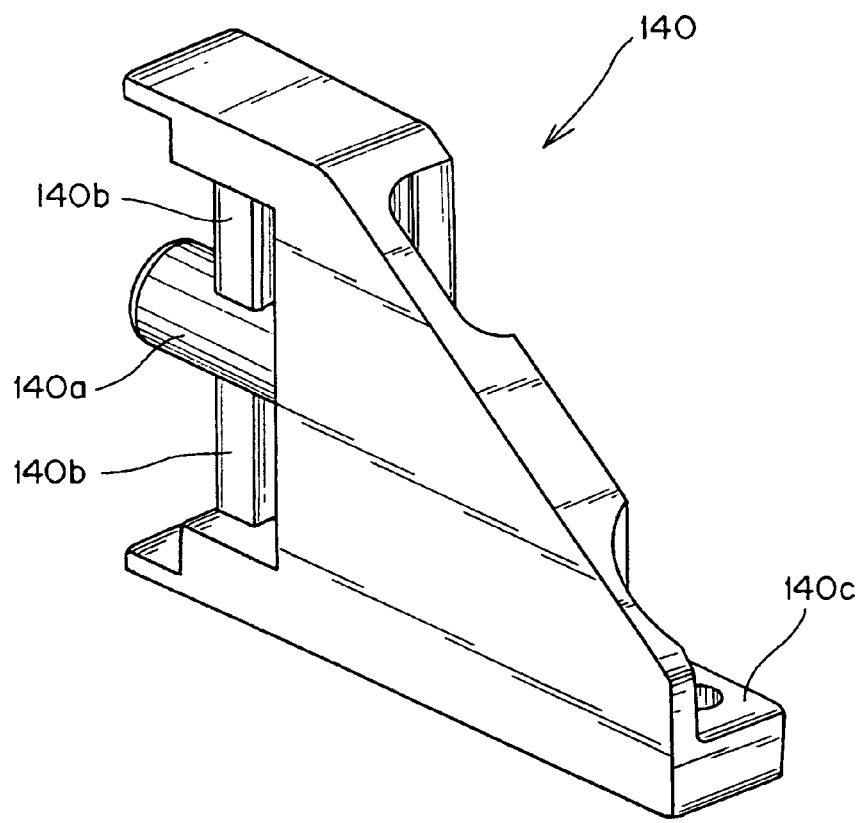
FIG. 16 is an enlarged view viewed from the inside of the mounting bracket shown in FIG. 15.
Figure 17:
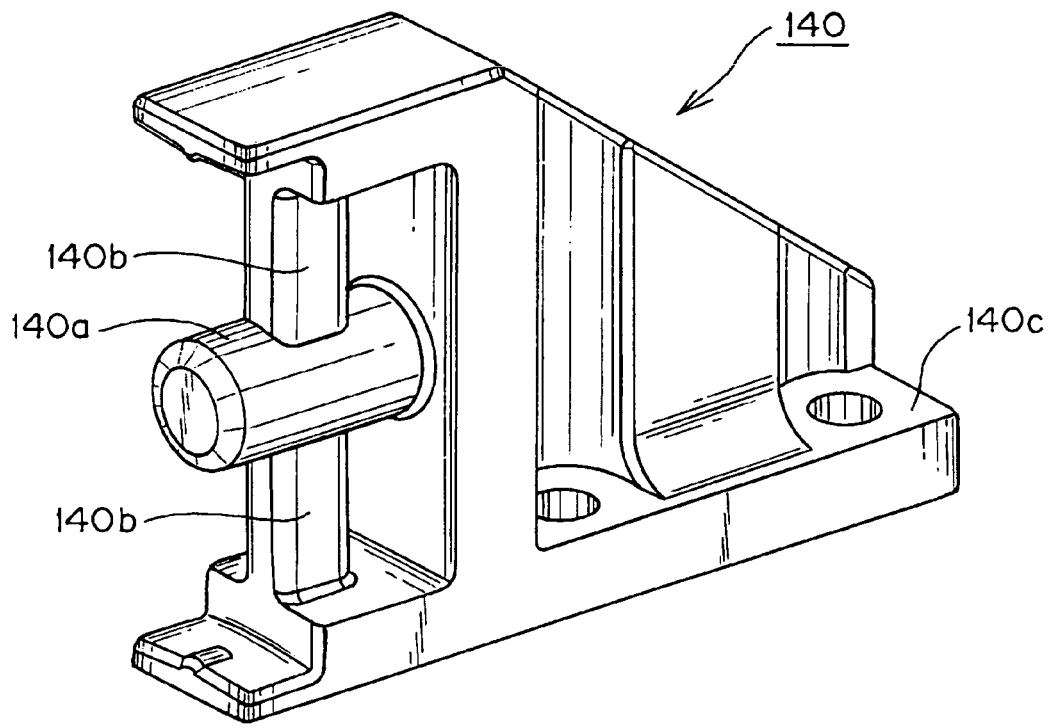
FIG. 17 is an enlarged view of a mounting bracket arranged on the left side of a mounting movable end.
Figure 18:
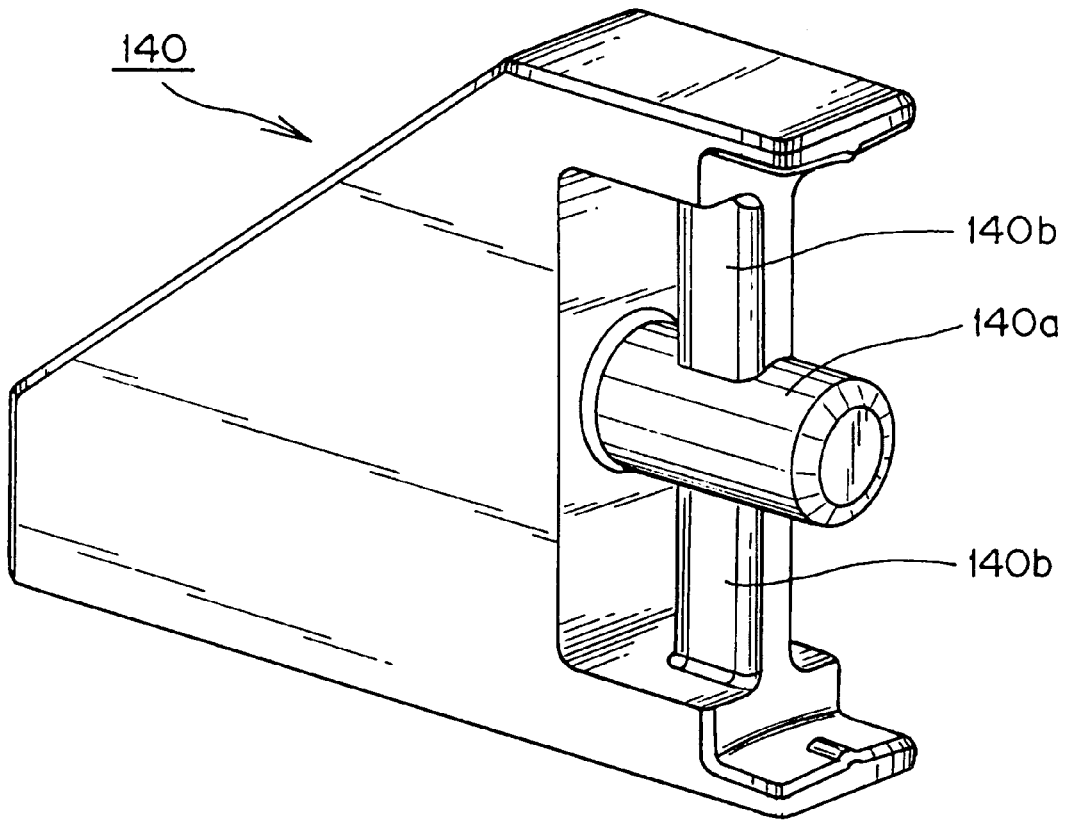
FIG. 18 is an enlarged view viewed from the inside of the mounting bracket shown in FIG. 17.

FIG. 10 is an enlarged view showing a connected state in a mounting movable end. FIG. 11 is an exploded view of the mounting movable end viewed from the outside while placing a movable end side adaptor at the center. FIG. 12 is an exploded view of the mounting movable end viewed from the inside while placing a movable end side adaptor at the center. FIG. 13 is an exploded view of a mounting fixed end viewed from the outside while placing a fixed end side adaptor at the center. FIG. 14 is an exploded view of the mounting fixed end viewed from the inside while placing a fixed end side adaptor at the center. FIG. 15 is an enlarged view of a mounting bracket arranged on the right side of a mounting movable end. FIG. 16 is an enlarged view viewed from the inside of the mounting bracket shown in FIG. 15. FIG. 17 is an enlarged view of a mounting bracket arranged on the left side of a mounting movable end. FIG. 18 is an enlarged view viewed from the inside of the mounting bracket shown in FIG. 17.

Figure 19:
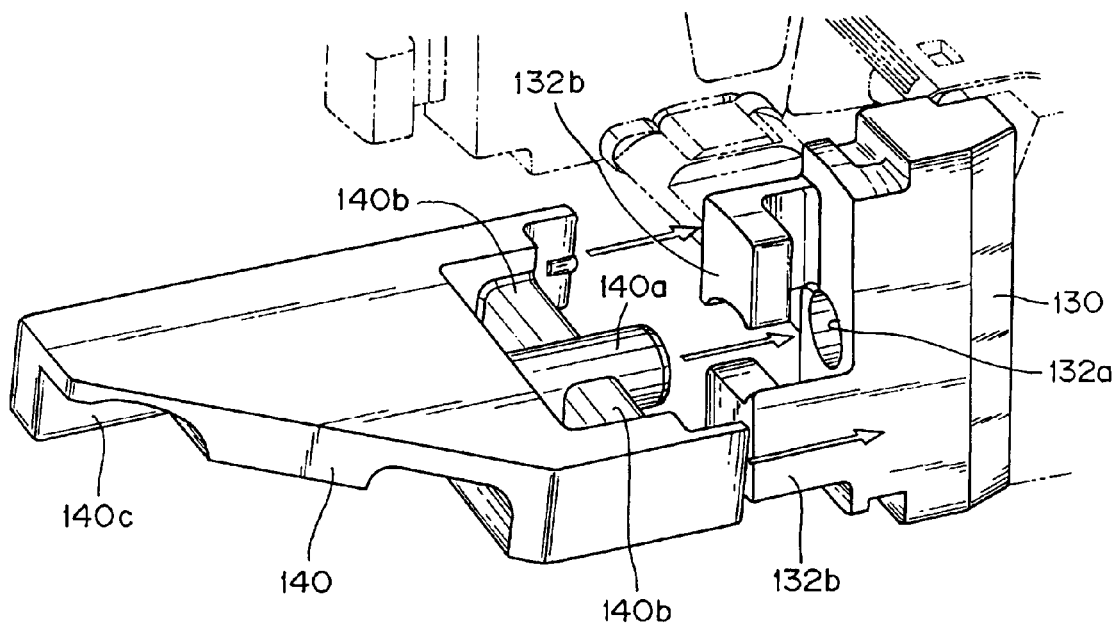
FIG. 19 is a view showing a positioned state just before starting of an incorporation exchange between the mounting bracket and the fixed end side adaptor.
Figure 20:
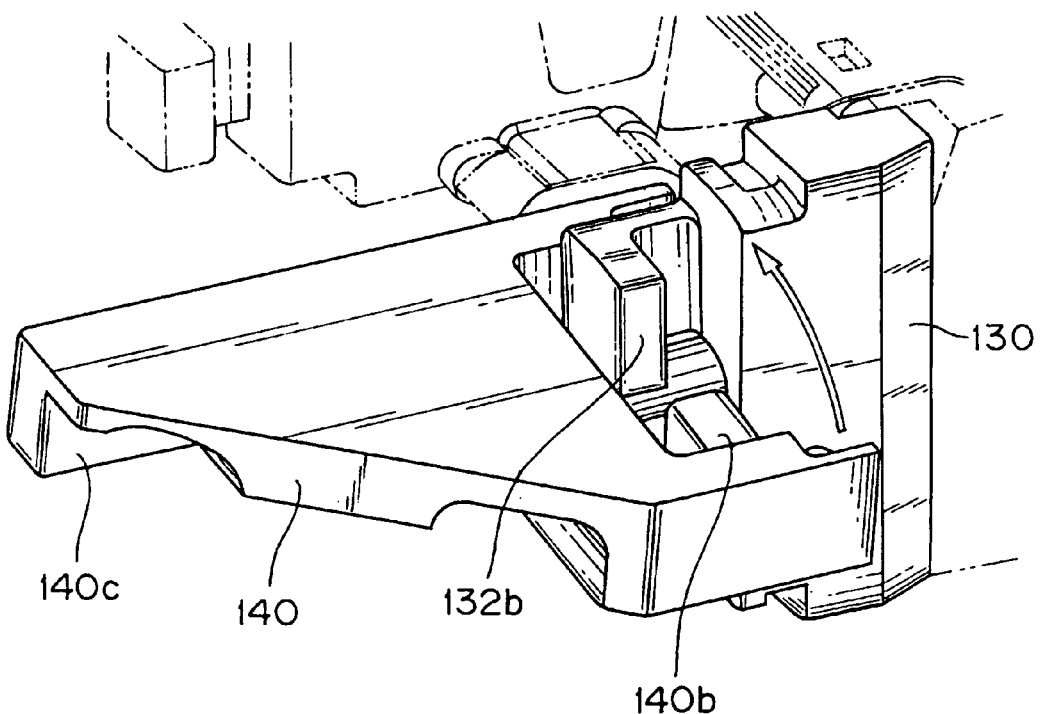
FIG. 20 is an incorporated view just before rotation of a mounting bracket with respect to the fixed end side adaptor.
Figure 21:
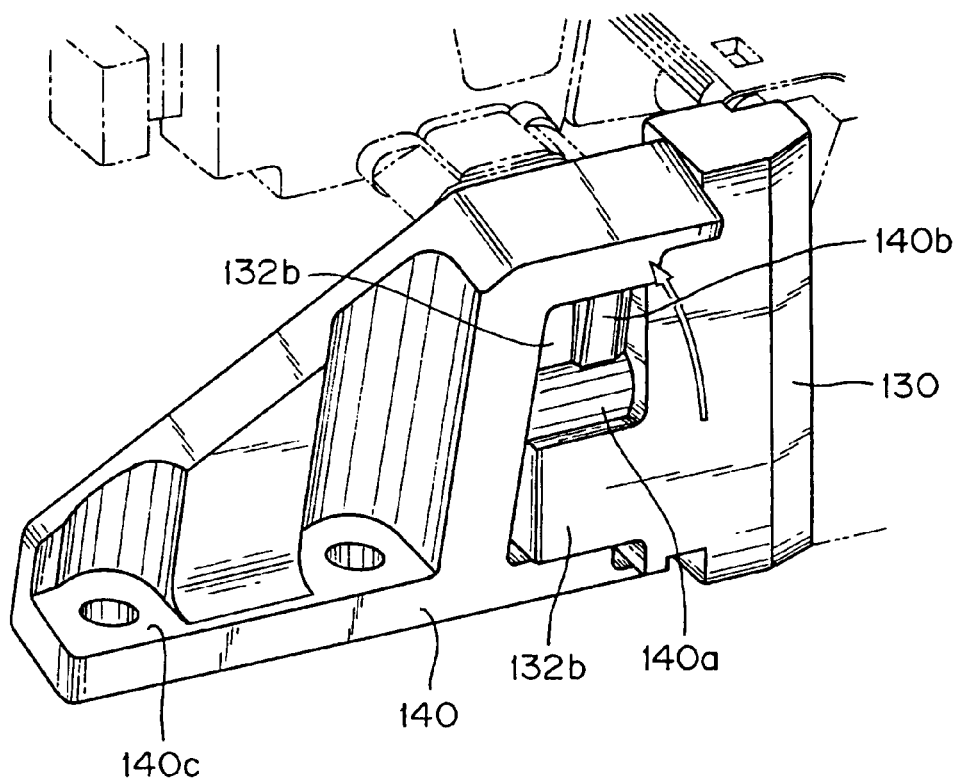
FIG. 21 is a view showing a rotation operation of the mounting bracket with respect to the fixed end side adaptor.
Figure 22:
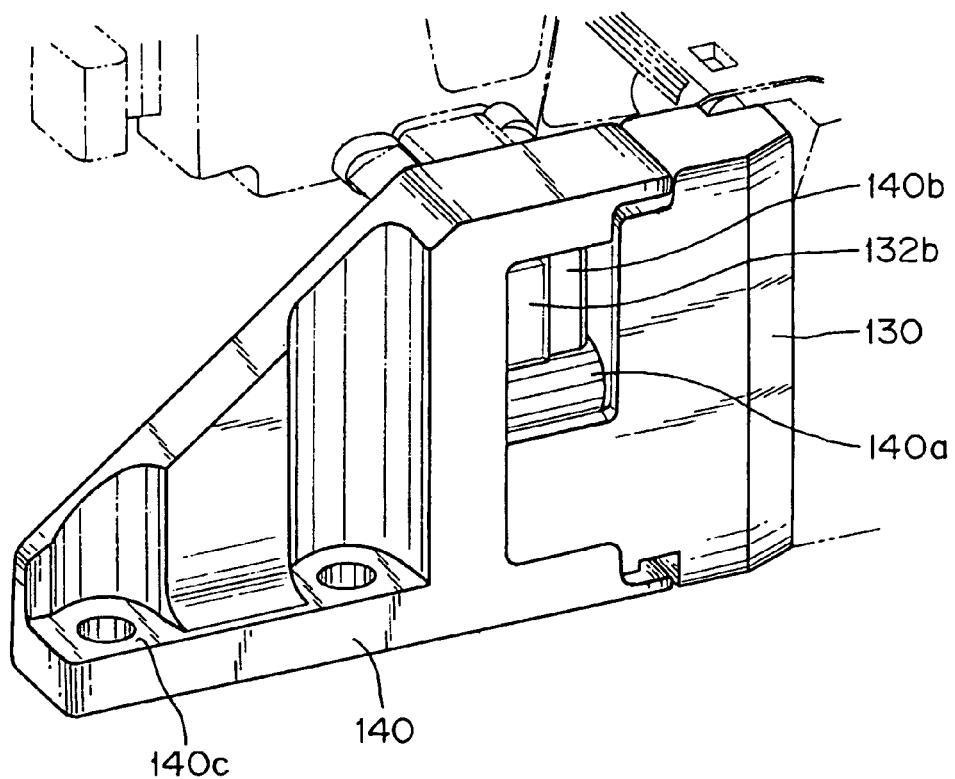
FIG. 22 is a view of an incorporation completion between the mounting bracket and the fixed end side adaptor.

Further, FIGS. 19 to 22 are views explaining incorporation change steps between the mounting bracket and a fixed end side adaptor. Particularly, FIG. 19 is a view showing a positioned state just before starting of an incorporation exchange between the mounting bracket and the fixed end side adaptor. FIG. 20 is an incorporated view just before rotation of a mounting bracket with respect to the fixed end side adaptor. FIG. 21 is a view showing a rotation operation of the mounting bracket with respect to the fixed end side adaptor, and FIG. 22 is a view of an incorporation completion between the mounting bracket and the fixed end side adaptor.

Figure 23:
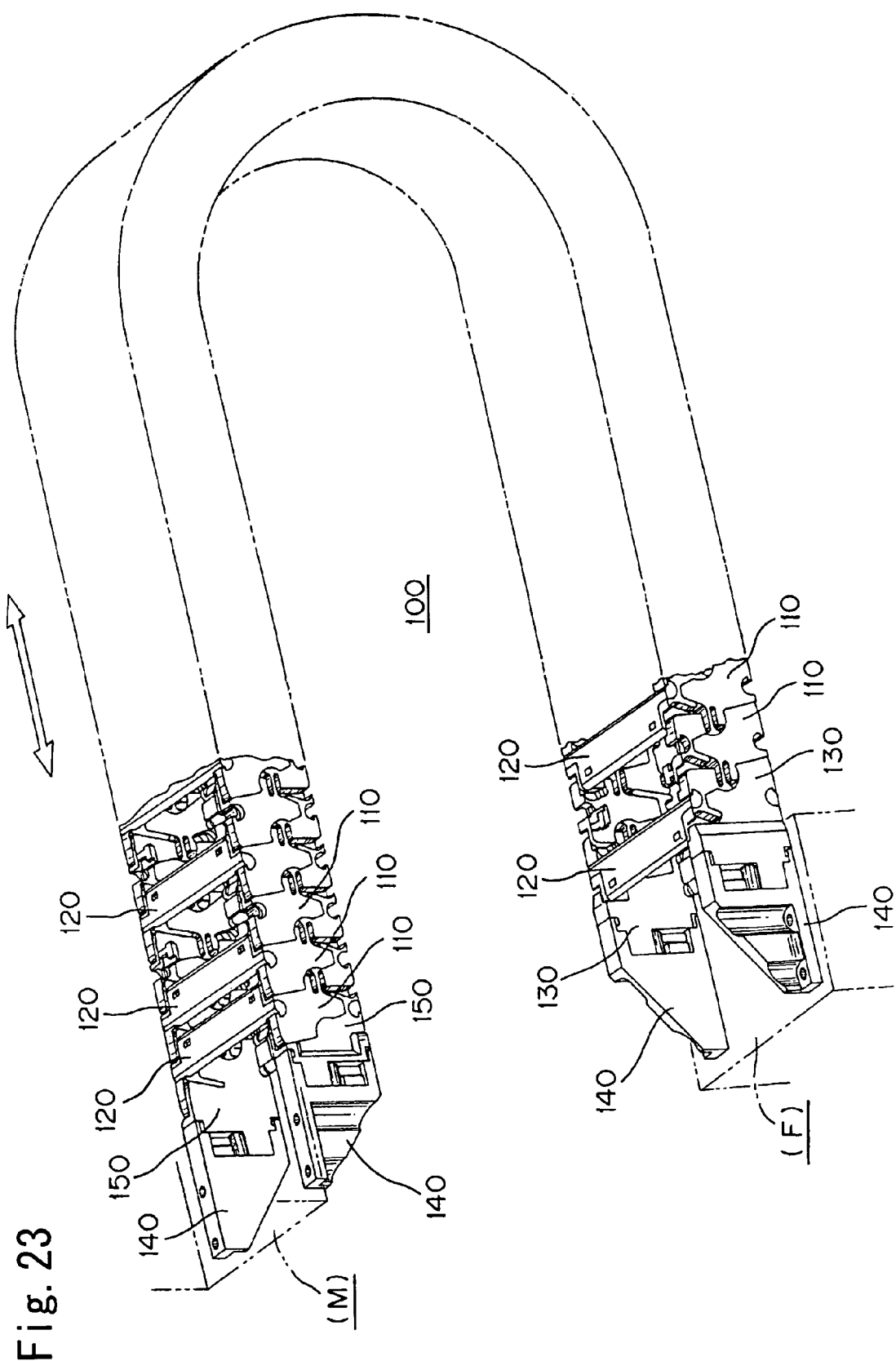
FIG. 23 is an entire view of a case where a mount form on the flexional inner circumferential side is changed to a mount form on the flexional outer circumferential side.
Figure 24:
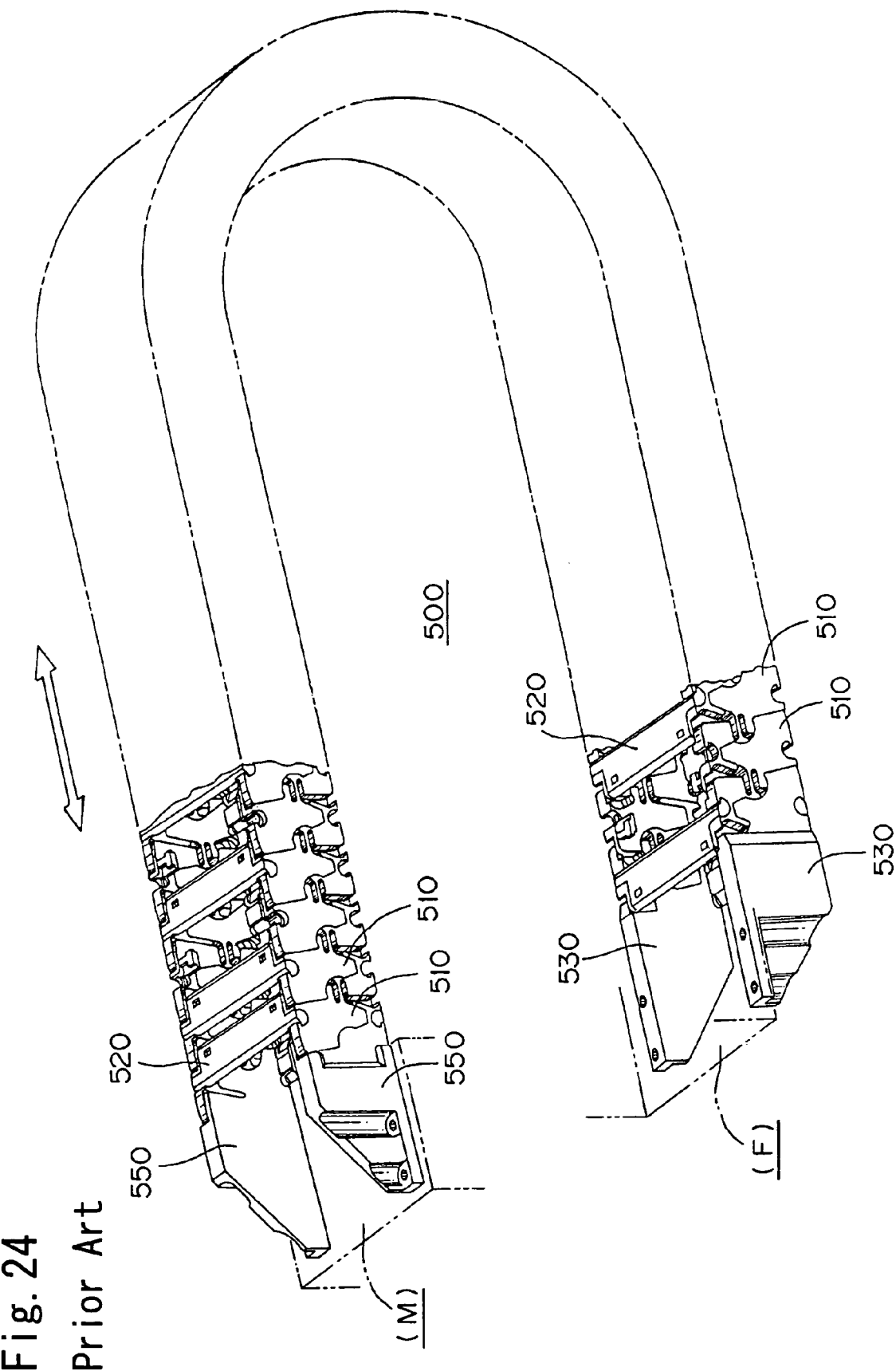
FIG. 24 is an entire view showing a use form of a cable or the like protection and guide device, which is a reference example for the present invention.
Figure 25:
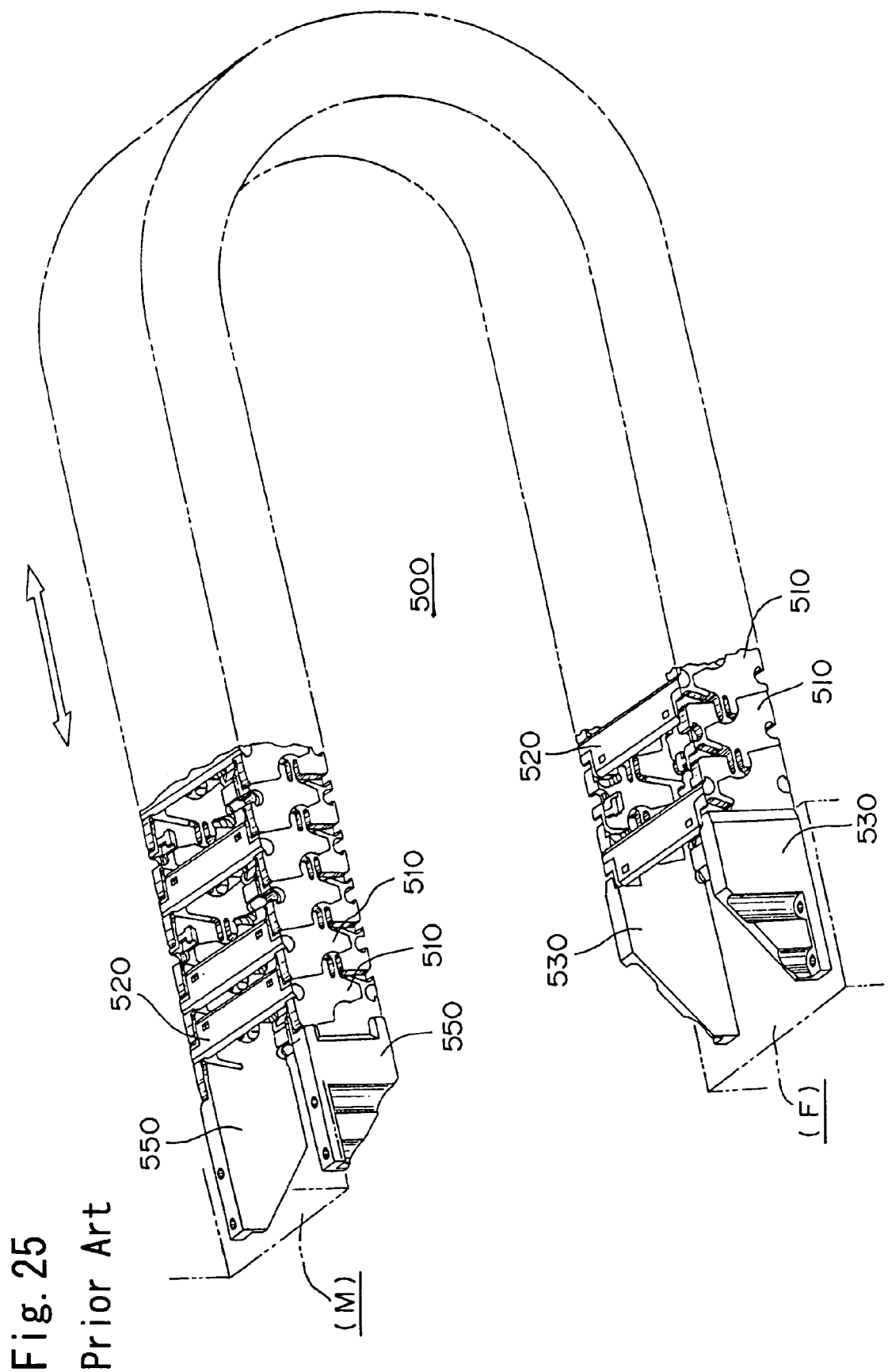
FIG. 25 is an entire view in which the flexional inner circumferential side mount form shown in FIG. 24 is changed to the flexional outer circumferential side mount form.

Further, FIG. 23 is an entire view of a case where a mount form on the flexional inner circumferential side is changed to a mount form on the flexional outer circumferential side.

The cable or the like protection and guide device 100, which is an example of the present invention, is used for protecting and guiding cables or the like C such as electric cables. The cable protection and guide device connects between a movable portion and a stationary portion in a semiconductor device, a pharmacy development testing device, a door opening/closing device for a vehicle or the like to carry out transmission and supply of electric signals. Hoses, which supply pressure liquid or pressure gas, may also be within the guide device. The guide device is longitudinally connected to connect between the movable portion and the stationary portion (not shown), and further the cable or the like protection and guide device 100 exhibits a linear position or a flexional position in accordance with relatively remote movement conditions between the movable portion and the stationary portion.

As shown in FIGS. 1 to 3, the cable or the like protection and guide device 100 is formed in such a manner that a number of right and left pairs of spaced plate units 110, 110 are connected to each other in a longitudinal direction of the cable from a mounting fixed end (F) attached to the above-mentioned stationary portion toward a mounting movable end (M) attached to the movable portion. Connecting plates 120 are respectively bridged over flexional inner circumferential sides and flexional outer circumferential sides of these side plate units 110, 110 with alternate arrangement intervals of the side plate units 110, 110 so that a cable (cables) or the like C is accommodated in cable accommodating space with a rectangular section. The cable is surrounded by these right and left pair of side plate units 110, 110 and these connecting plates 120, 120 along the longitudinal direction.

It is noted that although in the cable or the like protection and guide device 100 of this example, the connecting plates 120 are bridged in alternate arrangement intervals with respect to the side plate units 110, 110 connected to each other in a large number, for example they may be bridged by the correspondence of 1 to 1 in the respective side plate units 110 connected to each other in a large number.

As shown in FIG. 1, a pair of right and left mounting brackets 140, 140 are detachably connected to a pair of right and left side plate units 110, 110 adjacent to a mounting fixed end (F) through a pair of right and left fixed end side adaptors 130, 130, and a pair of right and left mounting brackets 140, 140 are detachably connected to a pair of right and left side plate units 110, 110 adjacent to a mounting movable end (M) through a pair of right and left movable end side adaptors 130, 130.

The above-mentioned side plate units 110, 110 will be described in detail below.

As shown in FIGS. 2 to 4, a pair of right and left spaced side plate units 110, 110 are molded by use of a fatigue resistant material of a rubber component-formulated polyamide resin and they are formed symmetrically.

And the side plate unit comprises a side plate front portion 111, which is connected to a preceding side plate unit 110, a side plate rear portion 112, which is connected to a subsequent side plate unit 110, and a flexible coupling portion 113 integrally intervened (interposed) between the side plate front portion 111 and the side rear portion 112.

In this case, since the coupling portion 113 composed of a polyamide rubber composition, which is a fatigue resistant resin, is flexibly adapted to repeated flexions, the cable or the like protection and guide device 100 can exhibit excellent fatigue resistance to repeated flexions. The side plate front portion 111 and side plate rear portion 112 concentrate flexion strain liable to be generated during a flexional operation to absorb it so that the cable or the like protection and guide device 100 can exhibit excellent stability of a cable holding form.

The side plate rear portion 112 of the preceding side plate (not shown) and the side plate front portion 111 of the side plate unit 110 subsequently connected to the side plate rear portion 112 are, as shown in FIGS. 4 and 5, respectively provide a flexional outer circumferential side concave portion/convex portion engagement mechanism Sa, a flexional inner circumferential side concave portion/convex portion engagement mechanism Sb and a concave portion/convex portion engagement mechanism Sc located in the vicinity of a coupling portion 113, which are engaged with each other. And side plate units 110, 110 adjacent to each other through these concave portion/convex portion engagement mechanisms Sa, Sb and Sc are attachable to and detachable from each other. Maintenance of the cable or the like protection and guide device 100 can be easily attained during connection and disconnection of the side plate units 110, 110.

The concave portion/convex portion engagement mechanism Sa located on the flexional outer circumferential side of the example of the present invention comprises a horn-shaped first engagement protrusion 114a and a recess-shaped first hole 115a. Recess-shaped first hole 115a detachably engages the engagement protrusion 114a, and similarly, the concave portion/convex portion engagement mechanism Sb located on the flexional inner circumferential side comprises a second engagement protrusion 114b composed of a hook-shaped engagement hook and a recess-shaped second hole 115b which detachably engages the engagement protrusion 114b.

The concave portion/convex portion engagement mechanism Sc located in the vicinity of a coupling portion 113 of the side plate unit 110 comprises a third engagement protrusion 114c composed of a cylindrical engagement pin and a dimple-shaped third hole 115c which detachably engages the engagement protrusion 114c.

Two sets of linear position holding surfaces each holding a linear connection state of the side plate unit 110, that is a flexional outer circumferential side linear position holding surface Xa and a flexional inner circumferential side linear position holding surface Xb, are formed, (1) between a stepped, offset side surface of a side plate front portion 111 positioned on a flexional outer circumferential side and a front end of the side plate front portion of the subsequent side plate (not shown) and, (2) between a stepped, offset side surface of a side plate rear portion 112 positioned on a flexional inner circumferential side and a front end of the side plate rear portion of the subsequent side plate (not shown).

Two sets of flexional position restricting surfaces each restricting a flexional connection state of the side plate unit 110, that is a flexional inner circumferential side flexional position restricting surface Yb and a flexional outer circumferential side flexional position restricting surface Ya, are formed (1) between a stepped, offset side surface of a side plate rear portion 112 positioned on a flexional inner circumferential side and a front end of the side plate rear portion of the subsequent side plate (not shown) and (2) between a stepped, offset side surface of a side plate front portion 111 positioned on a flexional outer circumferential side and a stepped, offset side surface of a side plate rear portion of the subsequent side plate (not shown).

As explained above, in the cable or the like protection and guide device 100 of the present invention, in the state of linear position holding, the flexional outer circumferential side linear position holding surface Xa and the flexional inner circumferential linear position holding surface Xb abut on each other while the flexional inner circumferential side flexional position restricting surface Yb and the flexional outer circumferential side flexional position restricting surface Ya are respectively opened so that the linear position is reliably held without applying a load to the coupling portion 113.

And in the state of flexional position restriction, the flexional inner circumferential side flexional position restricting surface Yb and the flexional outer circumferential flexional position restricting surface Ya abut on each other while the flexional outer circumferential side linear position holding surface Xa and the flexional inner circumferential side linear position holding surface Xb are respectively opened so that the flexional position is reliably held without applying a load to the coupling portion 113.

And in the state of flexional position restriction, the flexional inner circumferential side flexional position restricting surface Yb and the flexional outer circumferential flexional position restricting surface Ya abut on each other while the flexional outer circumferential side linear position holding surface Xa and the flexional inner circumferential side linear position holding surface Xb are respectively opened so that the flexional position is reliably held without applying a load to the coupling portion 113.

The incorporation between the side plate unit 110 and the connecting plate 120 used in the cable or the like protection and guide device 100 according to the present example will be described below with reference to FIGS. 6 to 10.

As shown in FIGS. 6 to 10, the connecting plate 120 includes a pair of right and left supporting shafts 121, 121 extending from both ends in a protruded manner and attachably fitted onto a pair of right and left side plates (not shown) and a louver portion 122, which functions as a lid by pivoting about the pair of right and left supporting shafts 121, 121, and forms a connecting plate engagement mechanism L (La, Lb, Lc, Ld) between the pair of right and left side plates as described later.

The connecting plate engagement mechanism L shown in FIG. 9 comprises a width direction positioning portion La where the supporting shaft 121 of the connecting plate 120 and a fitting shaft hole 116 in the side plate unit 110 are engaged with each other in an at least partially cut out concave portion/convex portion engagement. A pivot restricting portion Lb is also shown where the supporting shaft 121 of the connecting plate 120 and a fitting shaft hole 116 in the side plate unit 110 are engaged with each other in a partially cut out concave portion/convex portion engagement. A horizontal direction positioning portion Lc is shown engaged in a concave portion/convex portion engagement between the louver portion 122 of the connecting plate 120 and a tongue piece supporting portion 117 formed in a protruded manner on the inner side of the side plate unit 110. A bridge state holding portion Ld is shown where the louver portion 122 of the connecting plate 120 is engaged with the tongue piece supporting portion 117 of the side plate unit 110 in a concave portion/convex portion engagement.

The incorporation of the above-described side plate unit 110 with the connecting plate 120 is described below as follows.

First, as shown in FIG. 9 while a louver portion 122 of a connecting plate 120 is raised, a pair of right and left supporting shafts 121, 121 formed on both ends of the connecting plate 120 in a protruded manner are placed in a state where these supporting shafts 121, 121 face fitting shaft holes 116, 116 formed in a pair of right and left side plate units 110, just before their incorporation.

And as shown by the arrow in FIG. 9, from a state where the louver portion 122 of the connecting plate 120 is raised, the pair of right and left supporting shafts 121 are respectively incorporated into the fitting shaft holes 116 formed in the pair of right and left side plate units 110.

At this time a width direction positioning portion La formed by partially cutting out the supporting shaft 121 and the fitting shaft hole 116 guides the supporting shaft 121 of the connecting plate 120 to a proper setting position without generating a displacement in the width direction in the fitting shaft hole 116.

As shown in FIG. 6, the supporting shaft 121 of the connecting plate 120 is incorporated into the fitting shaft hole 116 of the side plate unit 110 as it is rotated or pivoted by about ¾ rotation in the fitting shaft hole 116 to reach a lid-like state of the louver portion 122 of the connecting plate 120. At this time a pivot restricting portion Lb (formed by cutting out a part of each of the supporting shaft 121 and the fitting shaft hole 116 by about a ¼ rotation) guides the louver portion 122 of the connecting plate 120 to a pivot restriction position exhibiting a complete lid-like state of the louver portion 122.

In this manner, a lid-like state of the louver portion 122 of the connecting plate 120, a so-called louver type connecting plate's incorporation completion state is obtained. At this time the horizontal direction positioning portion Lc formed between the louver portion 122 of the connecting plate 120 and the tongue piece supporting portion 117 formed on an inner side of the side plate unit 110 in a protruded manner allows the louver portion 122 of the connecting plate 120 to engage with the tongue piece supporting portion 117 of the side plate unit 110 in a concave portion/convex portion engagement and thereby reliably holds the connecting plate 120 in the horizontal direction.

In the bridge state of the connecting plate 120, both ends of the louver portion 122 abut on the inner sides of the side plate units 110. That is, since the louver portion 122 of the above-mentioned connecting plate 120 includes a bridge state holding portion Ld, which engages with the tongue piece supporting portion 117 of the side plate unit 110 in a concave portion/convex portion engagement manner, when a cable(s) or the like C is protected and guided while being flexed, even if the cable or the like C receives such shearing force that is crushed in the width direction, both ends of the louver portion 122 entirely abut on the inner sides of the side plate units 110 so that cable accommodating space surrounded by the side plate units 110 and the connecting plates 120 is strongly ensured (maintained).

Further, even if force that comes out of the cable or the like C accommodated inside is generated at the time of protection and guiding the cables or the like C, since a pair of right and left supporting shafts 121, 121 formed on the both ends of the connecting plate 120 in a protruded manner are fitted into a pair of right and left side plate units 110, 110, the connecting plate 120 is supported on the pair of right and left side plate units 110, 110 by both ends of the connecting plate 120 whereby the pair of right and left supporting shafts 121, 121 of the connecting plate 120 remain engaged and secured with respect to the pair of right and left side plate units 110, 110 and an inadvertent disengagement can be completely avoided. Further, since both ends of the connecting plate 120 are simultaneously fitted onto the pair of right and left side plate units 110, 110 during an opening/closing operation of the connecting plates, bite damage of the cable or the like C in the cable or the like accommodating space during the opening/closing operation of the connecting plates can be also completely avoided.

Further, since the louver portion 122 of the connecting plate 120 is formed so that it is pivoted about the pair of right and left supporting shafts 121, 121, the connecting plate 120 is rotated or pivoted with respect to the side plate unit at the time of the maintenance of the cable or the like C so that the louver portion 122 can be raised. Thus the cable or the like C is exposed and easily maintained.

Further, the above-mentioned connecting plate engagement mechanism L is formed in a pair of right and left fixed end side adaptors 130, 130 as well as in a pair of right and left movable end side adaptors 150, 150, as shown in FIG. 1.

That is since a connecting plate 120 is bridged over the pair of fixed end side adaptors as well as over the pair of movable end side adaptors, respectively, a strong connection is exhibited to the pair of right and left fixed end side adaptors 130, 130, and the pair of right and left movable end side adaptors 150, 150, at both ends of the connecting plate 120 and inadvertent disengagement is avoided. As a result assembly and disassembly of the mounting brackets 140 with and from the fixed end side adaptors 130 and the movable end side adaptors 150 becomes easy and a maintenance operation of a cable(s) can be easily performed.

Next, connected structures at the mounting fixed end and the mounting movable end of a cable or the like protection and guide device 100 of the present invention, which are used in the device 100, will be described in detail below with reference to FIGS. 10 to 22.

First, in the connecting structure at the above-mentioned mounting movable end, a pair of right and left mounting brackets 140, 140 is detachably connected to a pair of right and left side plate units 110, 110 in proximity to a mounting movable end (M), through a pair of movable end side adaptors 150, 150, respectively, as shown in FIGS. 10 to 12.

A pair of right and left mounting brackets 140, 140 is detachably connected to a pair of right and left side plate units 110, 110 in proximity to a mounting fixed end (F), through a pair of fixed end side adaptors 130, 130, respectively, as shown in FIGS. 13 and 14.

The movable end side adaptor 150 includes: a unit side connecting portion (151a to 151e), which is the same form used between side plate units 110, 110; and, a bracket side connecting portion 152, which is connected to a mounting bracket 140, as shown in FIGS. 11 and 12. Further, the unit side connecting portion 151 comprises a flexional outer circumferential side first engagement protrusion 151a of a horn type protrusion which engages with a first hole 115a to be engaged in the side plate unit 110, a recess-shaped flexional inner circumferential side second hole 151b which engages with a second engagement protrusion 114b of the side plate unit 110, a third hole 151c in the form of a dimple which engages with a third engagement protrusion 114c of the side plate unit 110, a flexional inner circumferential side fitting shaft hole which is inserted into a supporting shaft 121 of the connecting plate 120, a flexional inner circumferential side tongue piece supporting portion 151e which engages with a louver portion 122 of the connecting plate 120 in a concave portion/convex portion engagement.

The bracket side connecting portion 152 comprises a shaft hole 152a for rotating a turnover shaft provided in a mounting bracket 140, which is described later, in a protruded manner, and, a holding arm 152b for holding an engagement post provided in the mounting bracket 140 in a protruded manner.

In the fixed end side adaptor 130 are formed a unit side connecting portion 131 (131b to 131e) which has the same form as the side plate units 110, 110, and a bracket side connecting portion 132 which is connected to a mounting bracket 140, as shown in FIGS. 13 and 14. Further, the unit side connecting portion 131 comprises an flexional inner circumferential side second engagement protrusion 131b of an engagement hook which engages with a second hole 115b in the side plate unit 110, a third engagement protrusion 131c (an engagement pin) which engages with a third hole of the side plate unit 110, a flexional outer circumferential side fitting shaft hole 131d which is inserted into a supporting shaft 121 of the connecting plate 120, and, a flexional outer circumferential side tongue piece supporting portion 131e which engages with a louver portion 122 of the connecting plate 120 in a concave portion/convex portion engagement. The bracket side connecting portion 132 comprises a shaft hole 132a for rotating a turnover shaft provided in a mounting bracket 140, which is described later, in a protruded manner, and, a holding arm 132b for holding an engagement post provided in the mounting bracket 140 in a protruded manner.

Further, the bracket side connecting portion 152 of the above-mentioned movable end side adaptor 150 and the bracket side connecting portion 132 of the above-mentioned fixed end side adaptor 130 are symmetrical between the mounting movable end and the mounting fixed end, and are not interchangeable each other.

A pair of right and left mounting brackets 140 shown in FIGS. 15 to 18 each includes: (1) a turnover shaft 140a which engages with a shaft hole 152a formed in the bracket connecting portion 152 of the movable end side adaptor 150 and with a shaft hole 132a formed in the bracket connecting portion 132 of the fixed end side adaptor 130, respectively, and, (2) an engagement post 140b, which engages with a holding arm 152b formed in the bracket side connecting portion 152 of the movable side adaptor 150 and with a holding arm 132b formed in the bracket side connecting portion 132 of the fixed side adaptor 130, respectively. Further, the pair of right and left mounting brackets 140 conforms to and can be connected to a pair of right and left movable end side adaptors 150 and a pair of right and left fixed end side adaptors 130.

Further, in the pair of right and left mounting brackets are formed mounting outer surfaces 140c each having a round hole or an oval hole or the like, for being mounted at the mounting movable end or the mounting fixed end.

Here, a process for changing an assembly state of the mounting brackets 140 to the fixed end side adaptors 130 in FIG. 1 to an assembly state of the mounting brackets 140 to the fixed end side adaptors 130 in FIG. 23 will be illustratively explained with reference to FIGS. 19 to 22. First as shown in FIG. 19, a turnover shaft 140a is positioned so that it is inserted toward a shaft hole 132a just before the assembly change between a mounting bracket 140 and a fixed end side adaptor 130. The mounting bracket 140 is brought close to the fixed end side adaptor 130. After that as shown in FIG. 20 the rotation of the mounting bracket 140 is started with respect to the fixed end side adaptor 130, and as shown in FIG. 21 the mounting bracket 140 is caused to stand up while rotating the mounting bracket 140 with respect to the fixed end side adaptor 130. In this manner, as shown in FIG. 22 the assembly of the mounting bracket 140 onto the fixed end side adaptor 130 is completed.

In the thus obtained cable or the like protection and guide device 100 of the present example, when such a flexional outer circumferential side mount state as shown in FIG. 1 is changed to such a flexional inner circumferential side mount state as shown in FIG. 23, the change may be realized by interchanging between the right and left mounting brackets 140 with the fixed end side adaptor 130 and the movable end side adaptor 150 connected to the side plate units 140.

Thus in order to adapt this cable or the like protection and guide device 100 to various mount states on the flexional outer circumferential side and the flexional inner circumferential side, six kinds of mounting parts consisting of a pair of right and left mounting brackets 140, 140, a pair of right and left movable end side adaptors 150, 150 and a pair of right and left fixed end side adaptors 150, 150 is sufficient. As a result the cable or the like protection and guide device 100 can be adapted to various mounting states at the mounting fixed end and the mounting movable end by reducing the number of parts from eight kinds of mounting parts other than a side plate unit and assembly and disassembly operations of the device become easy.

In the cable or the like protection and guide device 100 of the present example, the fixed end side adaptor 130 and the movable end side adaptor 150 interconnect with mounting brackets 140. The mounting bracket includes a turnover shaft 140a provided in a protruded manner in the connecting direction from the adaptor side connecting portion of the mounting bracket 140. A shaft hole 132a in the bracket side connecting portion 132 of the fixed end side adaptor 130 and a shaft hole 152a in the bracket side connecting portion 152 of the movable end side adaptor receives the turnover shaft of a pivot shaft. The connection of the fixed end side adaptor 130 or the movable end side adaptor 150 to the mounting bracket 140 is performed irrespective of the connection form between the fixed end side adaptor 130 or movable end side adaptor 150 and the mounting bracket 140. Thus the assembly and disassembly of the mounting bracket 140 is easy and the effect of this invention is very large.

DESCRIPTION OF REFERENCE NUMERALS

100 . . . Cable or the like protection and guide device
110 . . . Side plate unit
111 . . . Side plate front portion
112 . . . Side plate rear portion
113 . . . Coupling portion
114a . . . Flexional outer circumferential side first engagement protrusion
114b . . . Flexional inner circumferential side second engagement protrusion
114c . . . Third engagement protrusion
115a . . . Flexional outer circumferential side first hole to be engaged
115b . . . Flexional inner circumferential side second hole to be engaged
115c . . . Third hole to be engaged
116 . . . Fitting engagement hole
117 . . . Tongue piece supporting portion
120 . . . Connecting plate
121 . . . Supporting shaft
122 . . . Louver portion
130 . . . Fixed end side adaptor
131 . . . Unit side connecting portion
131a . . . Flexional outer circumferential side first engagement protrusion
131b . . . Flexional inner circumferential side second hole to be engaged
131c . . . Third hole to be engaged
131d . . . Flexional inner circumferential side fitting shaft hole
131e . . . Flexional inner circumferential side tongue piece supporting portion
132 . . . Bracket side connecting portion
132a . . . Shaft hole
132b . . . Holding arm
140 . . . Mounting outer side surface
150 . . . Movable side adaptor
151 . . . Unit side connecting portion
151b . . . Flexional inner circumferential side second engagement protrusion
151c . . . Third engagement protrusion
151d . . . Flexional outer circumferential side fitting shaft hole
151e . . . Flexional outer circumferential side tongue piece supporting portion
152 . . . Bracket side connecting portion
152a . . . Shaft hole
152b . . . Holding arm
500 . . . Cable or the like protection and guide device
510 . . . Side plate unit
530 . . . Fixed side mounting bracket
550 . . . Movable side mounting bracket
Sa, Sb, Sc . . . Concave portion/convex portion engagement mechanism
Xa . . . Flexional outer circumferential side linear position holding surface
Ya . . . Flexional outer circumferential side flexional position restricting surface
Xb . . . Flexional inner circumferential side linear position holding surface
Yb . . . Flexional inner circumferential side flexional position restricting surface C . . . Cable (Cables) or the like
α . . . Maximum opening angle between flexional position restricting surfaces
La . . . Width direction positioning portion
Lb . . . Pivot restricting portion
Lc . . . Horizontal direction positioning portion
Ld . . . Bridge state holding portion Those skilled in the art will readily recognize that the invention has been set forth by way of example herein and that changes may be made to the invention without departing from the spirit and scope of the invention as set forth in the claims below.

The invention claimed is:

1. A cable protection and guide device comprising:
a plurality of pairs of right and left spaced side plates articulately connected to each other in a longitudinal direction enabling a portion of said side plates to form a flexional circumferential bend having a flexional inner circumferential side and flexional outer circumferential side;
each of said side plates includes a flexional inner circumferential side residing during bending on said flexional inner circumferential side of said bend;
each of said side plates includes an outer circumferential side residing during bending on said outer flexional circumferential side of said bend;
said pairs of right and left spaced side plates extending from a mounting fixed end toward a mounting movable end;
connecting plates are detachably bridged over flexional inner circumferential sides and flexional outer circumferential sides of said pairs of right and left spaced side plates in predetermined intervals such that a cable is accommodated in a cable accommodating space surrounded by said side plates and said connecting plates from the mounting fixed end toward the mounting movable end;
a first and second pair of interchangeable mounting brackets; one of said first pair of interchangeable mounting brackets removably affixed to said mounting fixed end and the other of said first pair of interchangeable mounting brackets removably affixed to said mounting movable end;
said one and said other of said first pair of interchangeable mounting brackets are interchangeable with each other;
one of said second pair of said interchangeable mounting brackets removably affixed to said mounting fixed end and the other of said second pair of interchangeable mounting brackets removably affixed to said mounting movable end;
said one and said other of said second pair of interchangeable mounting brackets are interchangeable with each other;
a pair of fixed end adapters;
one of said fixed end adapters detachably interposed between one of said right plates and said one of said first pair of interchangeable mounting brackets removably affixed to said mounting fixed end;
the other of said fixed end adapters detachably interposed between one of said left plates and said one of said second pair of interchangeable mounting brackets removably affixed to said mounting fixed end;
a pair of movable end adapters;
one of said movable end adapters detachably interposed between another of said right plates and said other of said first pair of interchangeable mounting brackets removably affixed to said mounting movable end;
the other of said mounting end adapters detachably interposed between another of said left plates and said other of said second pair of interchangeable mounting brackets removably affixed to said movable end;
said one of said fixed end adapters includes a bracket connection portion having holding arms for engaging said one of said first pair of said mounting brackets removably affixed to said mounting fixed end;
said one of said movable end adapters includes a bracket connection portion having holding arms for engaging said other of said first pair of mounting brackets removably affixed to said mounting movable end;
said bracket connection portions of said one of said fixed end adapters and said one of said movable end adapters are symmetrical;
said other of said fixed end adapters includes a bracket connection portion having holding arms for engaging said one of said second pair of mounting brackets removably affixed to said mounting fixed end;
said other of said movable end adapters includes a bracket connection portion having holding arms for engaging said other of said second pair of mounting brackets removably affixed to said mounting movable end;
said bracket connection portions of said other of said fixed end adapters and said other of said movable end adapters are symmetrical;
said one and said other of said fixed end adapters each include interengaging surfaces which matingly engage said right and left side plates, respectively; and,
said one and said other of said movable end adapters each include interengaging surfaces which matingly engage said another right and said another left side plates.

2. A cable protection and guide device according to claim 1, wherein said side plates comprise a side plate front portion, which is connected to a preceding side plate, a side plate rear portion, which is connected to a subsequent side, and a flexible coupling portion integrally intervened between said side plate front portion and said side plate rear portion.

3. A cable protection and guide device according to claim 2, wherein said side plates, said connecting plates, said fixed end side adapters, said movable end side adapter, and said mounting brackets are molded of a fatigue resistant resin material of a polyamide resin or a polybutylene terephthalate resin formulated with a component of elastomer or rubber.

4. A cable protection and guide device according to claim 2, wherein said connecting plates are bridged over said pair of fixed end side adapters and said pair of right and left movable end side adapters, respectively.

5. A cable protection and guide device according to claim 4, wherein said connecting plates include a pair of right and left supporting shafts interengaging said flexional inner and outer circumferential sides of said side plates.

6. A cable protection and guide device according to claim 5, wherein said side plates, said connecting plates, said fixed end side adapters, said movable end side adapter, and said mounting brackets are molded of a fatigue resistant resin material of a polyamide resin or a polybutylene terephthalate resin formulated with a component of elastomer or rubber.

7. A cable protection and guide device according to claim 4, wherein said side plates, said connecting plates, said fixed end side adapters, said movable end side adapter, and said mounting brackets are molded of a fatigue resistant resin material of a polyamide resin or a polybutylene terephthalate resin formulated with a component of elastomer or rubber.

8. A cable protection and guide device according to claim 2, wherein said connecting plates include a pair of right and left supporting shafts interengaging said flexional inner and outer circumferential sides of said side plates.

9. A cable protection and guide device according to claim 8, wherein said side plates, said connecting plates, said fixed end side adapters, said movable end side adapter, and said mounting brackets are molded of a fatigue resistant resin material of a polyamide resin or a polybutylene terephthalate resin formulated with a component of elastomer or rubber.

10. A cable protection and guide device according to claim 1, wherein said connecting plates are bridged over said pair of fixed end side adapters and said pair of right and left movable end side adapters, respectively.

11. A cable protection and guide device according to claim 10, wherein said connecting plates include a pair of right and left supporting shafts interengaging said flexional inner and outer circumferential sides of said side plates.

12. A cable protection and guide device according to claim 11, wherein said side plates, said connecting plates, said fixed end side adapters, said movable end side adapter, and said mounting brackets are molded of a fatigue resistant resin material of a polyamide resin or a polybutylene terephthalate resin formulated with a component of elastomer or rubber.

13. A cable protection and guide device according to claim 10, wherein said side plates, said connecting plates, said fixed end side adapters, said movable end side adapter, and said mounting brackets are molded of a fatigue resistant resin material of a polyamide resin or a polybutylene terephthalate resin formulated with a component of elastomer or rubber.

14. A cable protection and guide device according to claim 1, wherein said connecting plates include a pair of right and left supporting shafts interengaging said flexional inner and outer circumferential sides of said side plates.

15. A cable protection and guide device according to claim 14, wherein said side plates, said connecting plates, said fixed end side adapters, said movable end side adapter, and said mounting brackets are molded of a fatigue resistant resin material of a polyamide resin or a polybutylene terephthalate resin formulated with a component of elastomer or rubber.

16. A cable protection and guide device according to claim 1, wherein said side plates, said connecting plates, said fixed end side adapters, said movable end side adapter, and said mounting brackets are molded of a fatigue resistant resin material of a polyamide resin or a polybutylene terephthalate resin formulated with a component of elastomer or rubber.

* * * * *

UNITED STATES PATENT AND TRADEMARK OFFICE
CERTIFICATE OF CORRECTION

PATENT NO. : 7,406,819 B2 Page 1 of 1
APPLICATION NO. : 11/699912
DATED : August 5, 2008
INVENTOR(S) : Utaki et al.

It is certified that error appears in the above-identified patent and that said Letters Patent is hereby corrected as shown below:

Title page Item (56) please add:
References 7428808 UTAKI et al and 11/701,960 UTAKI Signed and Sealed this Third Day of February, 2009

JOHN DOLL
*Acting Director of the United States Patent and Trademark Office*